US012626157B2

(12) United States Patent
Dangi et al.

(10) Patent No.: US 12,626,157 B2
(45) Date of Patent: May 12, 2026

(54) IDENTIFYING IDLE-CORES IN DATA CENTERS USING MACHINE-LEARNING (ML)

(71) Applicant: NVIDIA Corporation, Santa Clara, CA (US)

(72) Inventors: Yogesh Dangi, Pune (IN); Manas Ranjan Jagadev, San Jose, CA (US); Sandip Kumar, Pune (IN); Kiran Sutar, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 845 days.

(21) Appl. No.: 17/956,638

(22) Filed: Sep. 29, 2022

(65) Prior Publication Data

US 2024/0112050 A1    Apr. 4, 2024

(51) Int. Cl.
*G06N 5/04*      (2023.01)
*G06F 1/3296*    (2019.01)
*G06N 5/022*     (2023.01)

(52) U.S. Cl.
CPC ............. *G06N 5/04* (2013.01); *G06F 1/3296* (2013.01); *G06N 5/022* (2013.01)

(58) Field of Classification Search
CPC ....................................................... G06N 4/04
USPC ........................................................... 706/12
See application file for complete search history.

(56) References Cited

U.S. PATENT DOCUMENTS

| | | | | |
|---|---|---|---|---|
| 11,144,433 | B2 * | 10/2021 | Shafi ....................... | G06F 11/32 |
| 2016/0070603 | A1 * | 3/2016 | Lu .......................... | G06F 9/5088 |
| | | | | 718/104 |
| 2019/0044860 | A1 * | 2/2019 | MacNamara ......... | H04L 49/901 |
| 2019/0266015 | A1 * | 8/2019 | Chandra .............. | G06F 9/4843 |
| 2021/0120491 | A1 * | 4/2021 | Gupta ................... | H04L 1/0015 |
| 2021/0191722 | A1 * | 6/2021 | Annamalai ........... | G06F 1/3243 |

* cited by examiner

*Primary Examiner* — Austin Hicks
(74) *Attorney, Agent, or Firm* — Lowenstein Sandler LLP

(57) ABSTRACT

Apparatuses, systems, and techniques to determine a number of idle cores of a computing device using a machine learning (ML) model based on a set of processes executed by the computing device are described. One method determines a set of processes executed by the computing device and determines, using an ML model, a number of cores of the computing device to be powered down based at least on the set of processes. The method updates a first mode of the number of cores to a second mode in which the number of cores consumes less power than in the first mode.

18 Claims, 22 Drawing Sheets

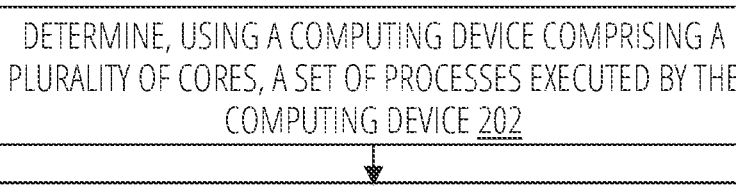

200

DETERMINE, USING A COMPUTING DEVICE COMPRISING A
PLURALITY OF CORES, A SET OF PROCESSES EXECUTED BY THE
COMPUTING DEVICE 202

DETERMINE, USING A MACHINE LEARNING (ML) MODEL, A
NUMBER OF CORES OF THE PLURALITY OF CORES TO BE
POWERED DOWN BASED ON THE SET OF PROCESSES 204

UPDATE A FIRST MODE OF THE NUMBER OF CORES TO A SECOND
MODE IN WHICH THE NUMBER OF CORES CONSUME LESS
POWER THAN IN THE FIRST MODE 206

CORE USAGE DATA

| APPLICATION ID | APPLICATION NAME | CPU CORE REQUIREMENT | TIMESTAMP |
|---|---|---|---|
| 602 | 604 | 606 | 608 |
| 1100 | ABC | 2 | 2122-06-21-09:20:00 |
| 1001 | XYZ | 1 | 2122-06-21-09:20:00 |
| 1100 | ABC | 2 | 2122-06-21-09:22:00 |
| 1001 | XYZ | 1 | 2122-06-21-09:22:00 |

800

| METRIC | POWER CONSUMPTION (WATTS) | PERCENT SAVINGS AGAINST PERFORMANCE MODE |
|---|---|---|
| ALL CORES IN PERFORMANCE MODE | 184 | N/A |
| 25% CORES IN POWER-SAVING MODE | 178 | 3.26% |
| 50% CORES IN POWER-SAVING MODE | 174 | 5.436% |
| 75% CORES IN POWER-SAVING MODE | 171 | 7.06% |
| 100% CORES IN POWER-SAVING MODE | 168 | 8.66% |

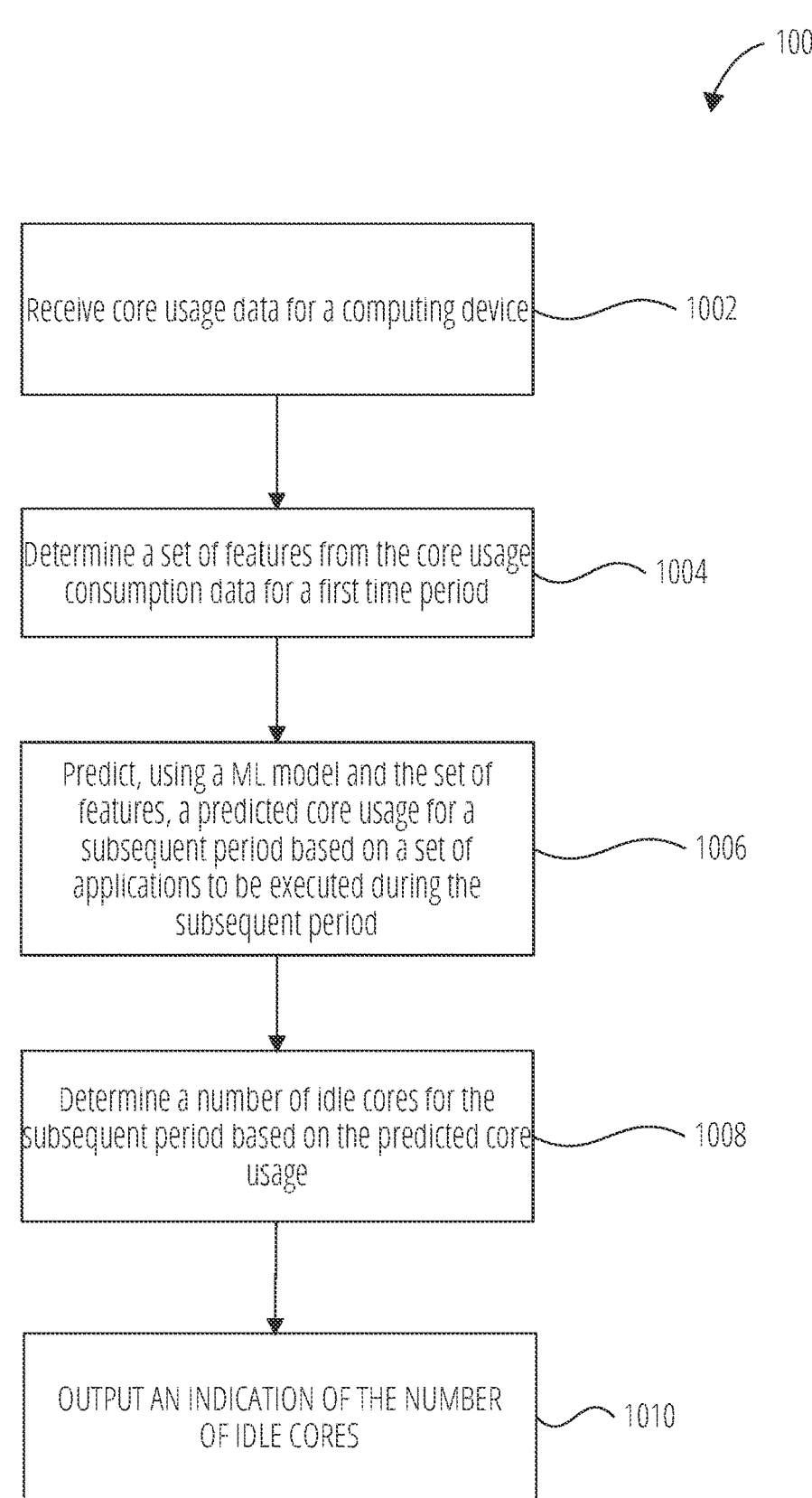

1000

Receive core usage data for a computing device — 1002

Determine a set of features from the core usage consumption data for a first time period — 1004

Predict, using a ML model and the set of features, a predicted core usage for a subsequent period based on a set of applications to be executed during the subsequent period — 1006

Determine a number of idle cores for the subsequent period based on the predicted core usage — 1008

OUTPUT AN INDICATION OF THE NUMBER OF IDLE CORES — 1010

Collect core usage consumption data for a computing device — 1102

Aggregate the core usage data into a set of features for a specified period — 1104

Train a ML model using the set of features — 1106

Deploy the trained ML model to an endpoint device to predict a CPU core requirement for a subsequent period based on a set of applications to be executed during the subsequent period — 1108

IDENTIFYING IDLE-CORES IN DATA CENTERS USING MACHINE-LEARNING (ML)

TECHNICAL FIELD

At least one embodiment pertains to processing resources used to perform and facilitate artificial intelligence. For example, at least one embodiment pertains to processors or computing systems used to train and use machine learning (ML) to identify and power down idle cores.

BACKGROUND

In multi-computing platforms and environments—such as data centers, supercomputers, high-performance computing (HPC) environments, cluster computing environments, or cloud computing environments, etc.—it is important to find idle or underutilized computing devices so that the usages of these computing devices can be more efficiently allocated by taking corrective actions. In the data center or cloud environment, it is important to save power (energy) consumed by a server. The applications or jobs executing on a server may not be consuming all available central processing unit (CPU) cores on the server. Each CPU core, however, still consumes power, so the unutilized CPU cores result in power wastage.

BRIEF DESCRIPTION OF DRAWINGS

Various embodiments in accordance with the present disclosure will be described with reference to the drawings, in which:

FIG. 2 illustrates a method of identifying and powering down idle cores in accordance with one embodiment.

FIG. 8 is a table of power consumption savings in powering down cores in the power-saving mode according to various embodiments.

FIG. 10 is a flow diagram of a method of identifying idle cores, according to at least one embodiment.

DETAILED DESCRIPTION

Idle-Core Identification Systems

Figure 1A:
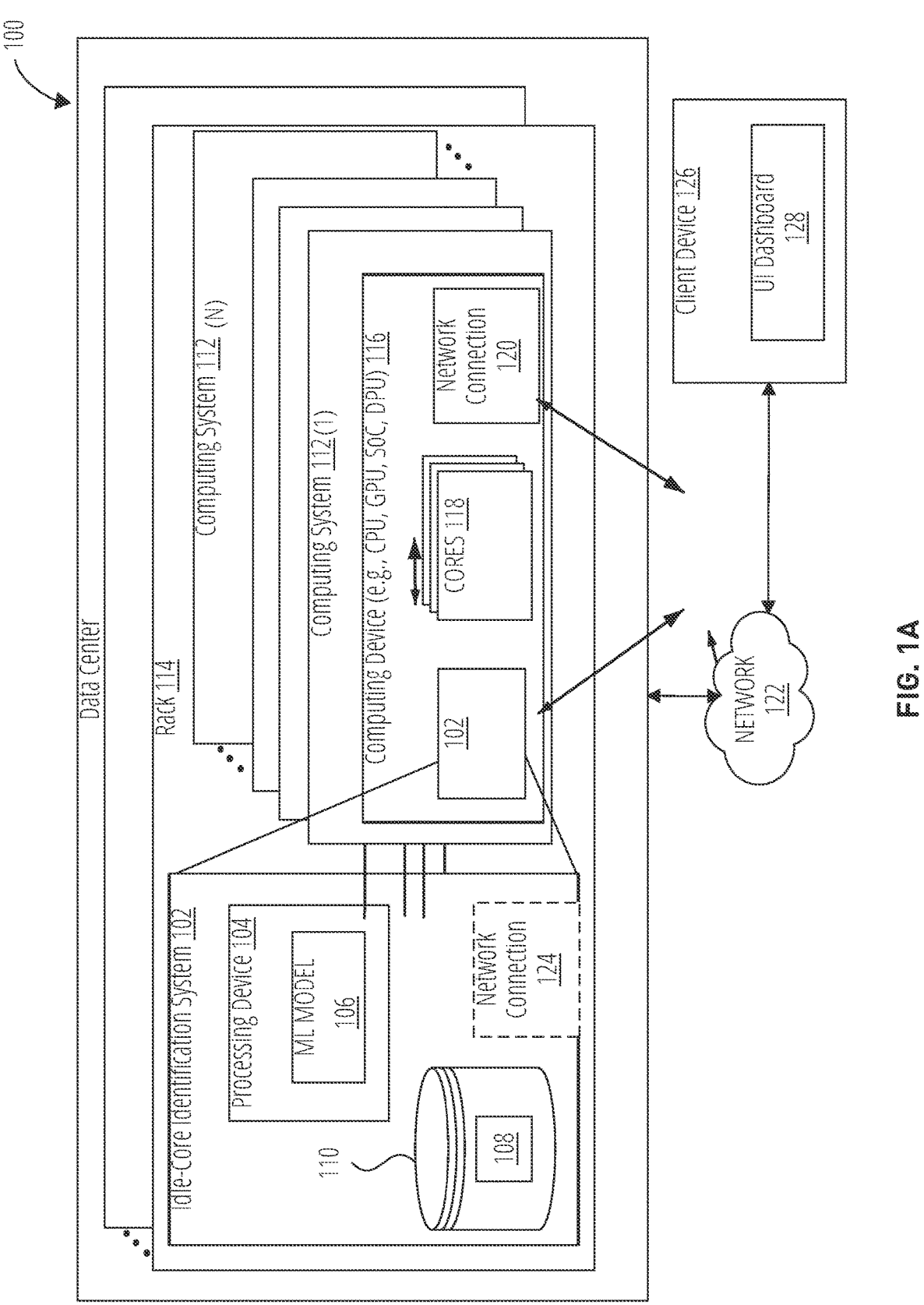
FIG. 1A is a block diagram of an idle-core identification system for identifying and powering down idle cores in an exemplary data center, according to at least one embodiment.

Embodiments described herein are directed to determining idle cores using ML-based techniques for saving power in data centers. Multiple cores can be located in a computing device. The computing devices can be CPUs, graphics processing units (GPUs), data processing units (DPUs), or the like. The cores of these computing devices can also be implemented as components in devices, such as (for example and without limitation): machines, computers, servers, network devices, or the like. These computing devices are important resources in a data center or a cloud environment. It is important to have efficient and effective monitoring or management of these resources. As described above, it is important to identify idle cores so that the usage of these cores can be enhanced by taking corrective actions. Saving power (energy) consumed by computing devices, like servers, is a priority in the data center environment. In conventional systems, operating systems can use power-saving techniques when a server is not being used, but the applications or jobs executing on a server may not be consuming all available CPU cores on the server. Each CPU core consumes power, so the idle CPU cores result in power wastage of available power.

Aspects and embodiments of the present disclosure address these and other challenges by providing a machine learning (ML)-based approach that determines a number of cores to be placed in a lower power state based on a set of processes being executed and updates a first mode of the number of cores to a second mode in which the number of cores consumes less power than in the first mode. The number of cores to be placed in a lower power state (e.g., powered down) is considered idle, unutilized, or underutilized by the applications or jobs executing on the computing device. The ML-based approach saves power consumption by identifying and powering down these idle, unutilized, or underutilized cores (hereinafter collectively referred to as "idle cores") in computing devices (e.g., servers) in a data center. By identifying and powering down idle cores, the overall carbon emissions by data centers can be reduced. For example, saving 1 watt of power at a CPU level can easily turn into 1.5 watts of savings at a server level due to power delivery efficiency losses inside the server, and up to approximately 3 watts in the data center. In addition, due to less power consumed by a core, there will be less heat generated by servers, hence this will, in turn, save power consumed by cooling appliances used in connection with these servers. Aspects and embodiments of the present disclosure can identify idle cores for each server in a data center, resulting in further power savings.

Aspects and embodiments of the present disclosure can determine power consumed by the computing devices for a given set of processes (e.g., applications, jobs, tasks, or routines) in a first time period and predict a number of cores needed for a subsequent period based on the power consumed. The number of cores needed for a given set of processes is considered a core requirement or a CPU core requirement. The CPU core requirement can be a summation of a CPU core requirement for each process. The ML-based approach can characterize the CPU core requirement for each process. Then, for a given set of processes for a subsequent period, the ML-based approach can predict the CPU core requirement for the subsequent period. The first time period for collecting and the subsequent time for forecasting are configurable. Aspects and embodiments of the present disclosure can find out a CPU core requirement for each application or job by analyzing historical CPU core consumption data for that application or job using machine learning techniques. As part of an initial phase, application profiling can be done for the CPU core requirement, where the actual CPU core usage data (e.g., every hour) for each application can be fed into a data store. The core usage information can be stored in a data store. The core usage information can be used by the ML model to predict or forecast the CPU core requirement for each application for a given point in time (e.g., next hour). The core usage information can be used to train the ML model to determine a number of cores to be placed in a lower power state down based on features extracted from the core usage information. Once the number of cores needed by applications is established on a server, the remaining unutilized cores can be put in a power-saving mode explicitly by a service, saving power consumed by the unutilized CPU cores.

As described above, conventional operating systems internally apply power-saving techniques when a server is not being used. By explicitly putting the unutilized CPU core into power-saving mode using the ML-based approach, maximum power-saving benefits are achieved. This reduces the overall energy consumption for a given data center. In the event that more CPU cores are needed, the CPU cores can be put back into a performance mode from the power savings mode. Additional details of the ML-based approach are described in more detail below with respect to FIG. 1A to FIG. 11.

FIG. 1A is a block diagram of an idle-core identification system 102 for identifying idle cores in an exemplary data center, according to at least one embodiment. The idle-core identification system 102 includes a processing device 104 that uses a trained ML model 106 to predict a number of idle cores in a computing device 116. Idle core, as used herein, refers to a core that can be powered down because it is idle, unutilized, or underutilized. The processing device 104 can identify core usage data 108 (e.g., power consumed metrics) stored in a data store 110 (e.g., database) for a given set of processes executed by a computing device 116 and predict a number of idle cores in the computing device 116 based on the core usage data 108 and the given set of processes. In at least one embodiment, the ML model 106 is a random forest regression model. In at least one embodiment, the ML model 106 is a support vector machine (SVM) model. Alternatively, the ML model 106 can be other types of ML models used to characterize a CPU core requirement for a given set of processes.

In at least one embodiment, the idle-core identification system 102 can be coupled to one or more computing systems 112(1)-112(N) in the data center 100, where N is a positive integer equal to or greater than zero. The data center 100 can include a rack 114 of one or more computing systems 112(1)-112(N), where N is a positive integer equal to or greater than zero. Each computing system 112 can include a computing device 116 with a set of cores 118. Each computing device 116 can include a network connection 120 to communicate with other devices in the data center 100 and/or other devices over a network 122. The idle-core identification system 102 can be implemented in one of the computing systems 112, one of the computing devices 116, or as a standalone computing system or computing device. The idle-core identification system 102 can include a network connection 124.

Figure 1B:
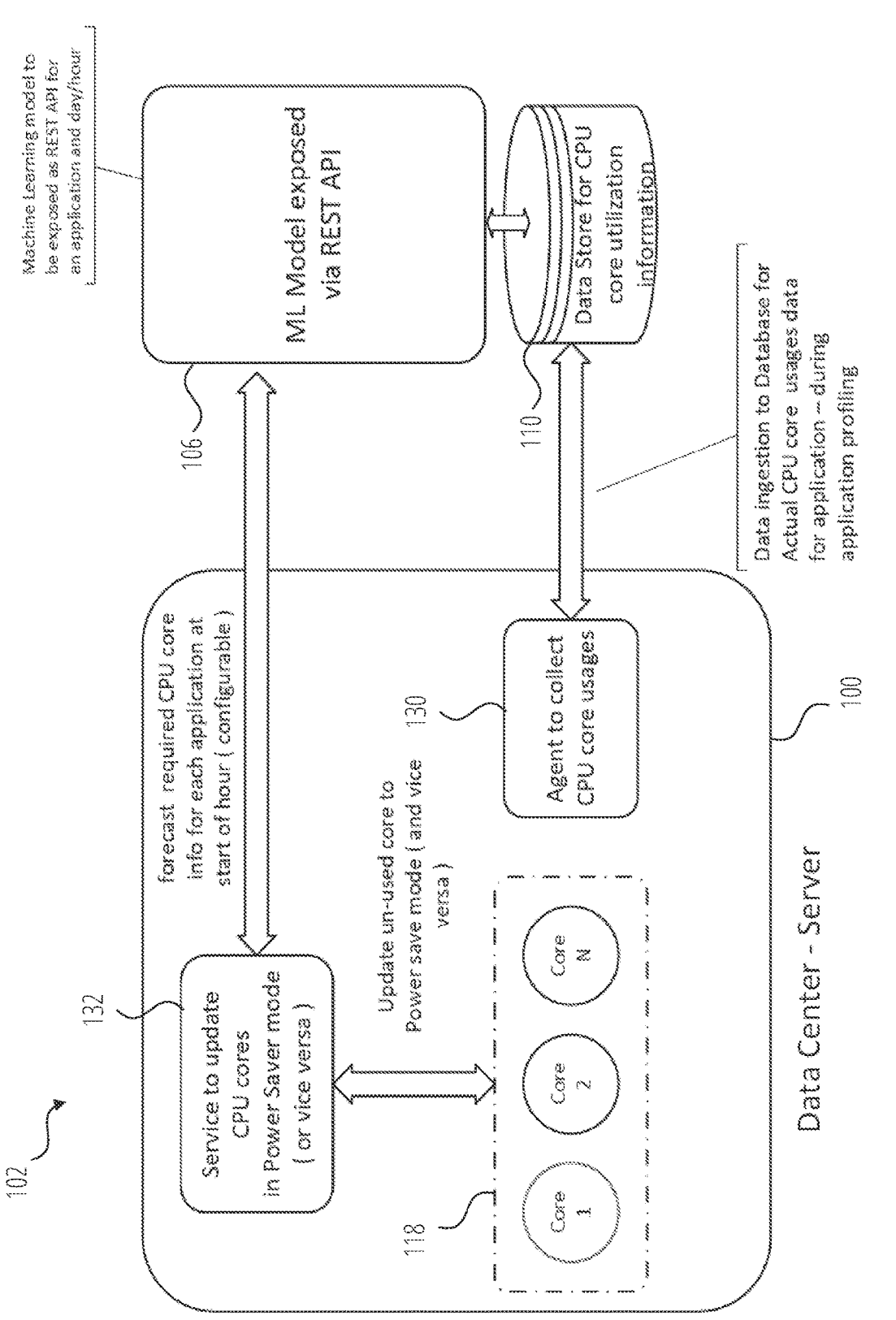
FIG. 1B is a block diagram of an idle-core identification system for identifying and powering down idle cores, according to at least one embodiment.

In at least one embodiment, the ML model 106 is trained using at least historical core utilization data for at least one process of the set of processes. In at least one embodiment, the ML model 106 is trained using historical core utilization data for each process during a first amount of time. Once the number of cores to be powered down has been identified, the number of cores is updated to the second mode for a second amount of time. In one or more embodiments, the first and second amounts of time can be the same duration or increment of time (e.g., one hour). For example, the set of processes can include at least a first process and a second process. The ML model 106 can be used to predict a first number of cores to be utilized by the first process and a second number of cores to be utilized by the second process. The first and second numbers can be subtracted from a total number of available cores to obtain the number of cores to be powered down. The total number of available cores can be less than a total number of cores in a computing device. This can be done to reserve a specific number or percentage of cores from being powered down. The first and second numbers can be predicted for a next time period in which the number of cores to be powered down is updated to the second mode. The ML model 106 can be trained on data associated with one or more previous time periods. The ML model 106 can be deployed as an object to a second computing device operatively coupled to the computing device, as illustrated in FIG. 1B.

In at least one embodiment, the idle-core identification system 102 can continue to determine a number of cores to be powered down during each subsequent period. For example, the idle-core identification system 102 can determine a second set of processes executed by the computing device at a second time subsequent to updating the number of cores to the second mode. The idle-core identification system 102 can determine, using the ML model 106, a second number of cores to be powered down based on the second set of processes. The idle-core identification system 102 can update the first mode of the second number of cores to the second mode. In at least one embodiment, the idle-core identification system 102 can send a command to the cores to toggle between a power-saving mode (first mode) and a second mode (performance mode). Sample commands are provided below for examples.

/sys/devices/system/cpu/cpu10/cpufreq/scaling_governor

Sample command: echo powersave|sudo tee

/sys/devices/system/cpu/cpu10/cpufreq/scaling_governor

In this series of sample commands, a portion of a directory can be updated with a number of cores to be updated to the first mode. To update a governor mode of the $10^{th}$ CPU core to the power-saving mode, the contents of the file above are updated to "powersave."

To update the governor mode of the $10^{th}$ CPU core to the performance mode, the contents of the below file can be updated to "performance":

/sys/devices/system/cpu/cpu10/cpufreq/scaling_governor

In another embodiment, the details of a Linux command are shown below to change the mode of the $10^{th}$ CPU.

Sample command: echo performance|sudo tee

/sys/devices/system/cpu/cpu10/cpufreq/scaling_governor

Figure 6:
FIG. 6 illustrates a table with core usage data according to at least one embodiment.

In at least one embodiment, the idle-core identification system 102 collects core utilization data (e.g., core usage data 108) for each process executed by the computing device during a first time period. The core utilization data can include, for each process, a process identifier, a count of utilized cores, and a timestamp, such as illustrated in FIG. 6. The idle-core identification system 102 can store the core utilization data for each process as historical core utilization data in data store 110 (e.g., a database). The data store 110 can store the historical CPU usage information for each application. This data can be used by ML algorithm(s). The ML model 106 is trained using the historical core utilization data for each process of the set of processes. Additional details of the idle-core identification system 102 are described below with respect to FIG. 1B.

In at least one embodiment, the processing device 104 can determine a set of features from the core usage data 108 for a first time period. The processing device 104 can predict or forecast a CPU core requirement for the computing device 116 in the first time period using the ML model 106 and the set of features. The processing device 104 can output an indication of the CPU core requirement of the computing device 116, responsive to the prediction. The processing device 104 can send the indication to a client device 126, such as to be displayed on a user interface (UI) dashboard 128. In at least one embodiment, the indication can include a number of cores needed or a number of cores that can be powered down. The processing device 104 can also use the indication to expressly power down a subset of the cores 118. In another embodiment, the indication can be merely a status for a given device identifier of the computing device. In at least one embodiment, an administrator can specify a device name and a date (or date range), and the idle-core identification system 102 can indicate a number of cores powered down (or powered on), corresponding to the device name for the specified data (or data range).

FIG. 1B is a block diagram of an idle-core identification system 102 for identifying and powering down idle cores, according to at least one embodiment. The idle-core identification system 102 includes a collection agent 130 for collecting core usage data 108 for one or more cores 118 computing devices in the data center 100 and a power-saving service 132 for updating one or more cores 118 in a power-saving mode. The collection agent 130 can be an agent or process that can run within an operating system (OS) of the computing device 116 to collect core usage data 108, such as CPU usage, Memory usage, and I/O usage. In at least one embodiment, the collection agent 130 can be executed by the processing device 104 of the idle-core identification system 102. As described herein, the processing device 104 can be part of the computing device 116. In at least one embodiment, the collection agent 130 is part of the OS executed by the processing device 104, the computing device 116, or another computing device in the computing system 112. In another embodiment, the collection agent 130 is separate from the OS. In at least one embodiment, the collection agent 130 is a hardware component that can collect the core usage data 108, as described herein. In example, non-limiting embodiments, the power-saving service 132 can be implemented as a service, an agent, or a process within the OS or outside of the OS in the kernel space or user space of the processing device 104, the computing device 116, or another computing device in the computing system 112. The power-saving service 132 can determine a number of idle (unutilized) cores 118 in the computing device 116 and update the number of idle cores 118 in a power-saving mode from a performance mode, saving the power consumed by the computing device 116. The power-saving service 132 can also update the cores 118 back to the performance mode when the number of idle cores 118 are needed during this period or during a subsequent period.

In at least one embodiment, the power-saving service 132 (e.g., cron service) can be executed on each computing device 116 (e.g., each server of the data center 100) at a fixed interval to update a core 118 from a performance mode to the power-saving mode or vice versa. The power-saving service 132 can make a call to the ML model 106 to determine a CPU core requirement for each application (e.g., for that hour and day) (i.e., the number of cores 118 needed by all applications for a given day/jour. The total number of idle cores can be expressed by the following equation (1):

$$\text{Total \# of idle core} = (\text{Total \# of cores on a server})*0.95 - \text{SUM (CPU core requirement for a given day/Hour)} \quad (1)$$

The above value of idle cores can be calculated for every hour (configurable), and many cores can be updated to a power-saving mode. For example, the total number of cores on a server can be multiplied by 95% to obtain a set of available cores, reserving the remaining 5% for OS-related activity and other mandatory processes. The multiplier can be configured and can be updated based on the CPU core requirement for the OS and other overhead programs. In at least one embodiment, at the start of every hour (or other configurable time), the CPU core requirements for each application can be predicted/forecasted using an ML algorithm when there are 96 total available cores on a server of a total of 100 cores 118. The core utilization by all applications for a given day/hour can be predicted to be 40 by the ML model 106 for the future day/hour. After subtracting 40 from 96, there are 56 remaining cores that can be powered down. This number of cores can be updated to the power-saving mode (e.g., number of cores to be powered down=96−40=56).

In at least one embodiment, the power-saving service 132 is a cron service that can execute according to a configurable schedule (e.g., every 1 hour). The power-saving service 132 can determine a number of cores 118 for each application using the ML model 106 via a representational state transfer application programming interface (REST API). REST API (also known as RESTful API) is an application programming interface (API or web interface) that allows interaction with RESTful web services. The power-saving service 132 can fetch core forecast information for a next period (e.g., a next hour) for each application using the ML model 106 via the REST API. The next period is a configurable parameter. In at least one embodiment, an object is used to serve the ML model 106 using an interface, such as the REST API. In at least one embodiment, the REST APIs are exposed to users (e.g., administrators of the data center 100), where a user can pass the feature attributes for a specified period (e.g., a given hour/day) as input. The REST API can return a response with an indication of the CPU core requirement for the specified period (e.g., the given hour/day). As described above, aggregated data can be used as inputs to the REST API endpoint for predicting the core requirement of the computing device for that given period. In at least one embodiment, the processing logic can use a summary job to make a call to REST API endpoint devices and store the core requirements of each configured computing device for each hour/day or other specified time periods. The summary job can use a UI dashboard 128 to provide visualization of the core requirements.

In at least one embodiment, the collection agent 130 is executed by the processing device 104 of FIG. 1A. In another embodiment, the collection agent 130 is executed by a processing device separate from the processing device 104. In at least one embodiment, the collection agent 130 is used by the idle-core identification system 102 for collecting core usage information for training the ML model 106 and for prediction or forecasting by the ML model 106 after training.

In at least one embodiment, the collection agent 130 can be executed for ingesting the core usage data 108 for CPU core usages for each application running on a server. The collection agent 130 can be scheduled as a cron job to run at a fixed interval. The core usage data 108 can be used by the ML algorithm to predict the CPU core requirements for each application for a given time (day/hour).

The collection agent 130 can fetch and store core usage data 108 in the data store 110. The core usage data 108 can include historical core usage data used for training the ML model 106 or core usage data used for prediction or forecasting by the ML model 106 once deployed. In at least one embodiment, the idle-core identification system 102 can analyze the core usage information stored in the data store 110 using ML techniques to train the ML model 106. The ML model 106 can be used to determine a CPU core requirement of a computing device based on a set of processes as described herein.

In at least one embodiment, once the core usage information is collected by the collection agent 130, the collection agent 130 (or a separate aggregation service (not illustrated in FIG. 1B)) can aggregate the data for a specified time period (e.g., each hour for a given day). The processing device 104 uses the aggregated data to train the ML model 106 and for feature sets to be input into the trained ML model 106 to determine CPU core requirements for each process.

In at least one embodiment, the collection agent 130 can collect the core usage data at every fixed internals (e.g., 30 seconds) and store the core usage data in database tables of a database (e.g., data store 110). The collection agent 130 (or a separate service) can aggregate the core usage data for a specified time period (e.g., each hour of a given day) and summarize usage data in a summary table, such as shown in an example summary table, Table 1.

TABLE 1

| | 1ˢᵗ Time Period (e.g., 1ˢᵗ hour) | 2ⁿᵈ Time Period (e.g., 2ⁿᵈ hour) | Nᵗʰ Time Period . . . (e.g., Nᵗʰ hour) |
|---|---|---|---|
| Device 1 | Application/job identifiers = d1 | Application/job identifiers = d2 | . . . Application/job identifiers = dN |

TABLE 1-continued

| | 1ˢᵗ Time Period (e.g., 1ˢᵗ hour) | 2ⁿᵈ Time Period (e.g., 2ⁿᵈ hour) | Nᵗʰ Time Period . . . (e.g., Nᵗʰ hour) |
|---|---|---|---|
| Device 2 | Application/job identifiers = d1 | Application/job identifiers = d2 | . . . |
| . . . | . . . | . . . | . . . . . . |
| Device M | Application/job identifiers = d1 | Application/job identifiers = d2 | Application/job identifiers = dN |

In at least one embodiment, once the core usage data for all of the cores 118 (and/or computing devices 116) being monitored is collected, the idle-core identification system 102 can use the core usage data in the summary table to train the ML model 106 using various machine learning techniques to predict CPU core requirements for each application (or other processes) or set of applications.

In at least one embodiment, a system includes a memory device and a processing device operatively coupled to the memory device. The processing device can include a set of processing units. The processing device can determine a set of processes being executed and determine, using an ML model, a number of processing units of the set of processing units to be powered down (placed in a lower power state) based at least on the set of processes. The processing device can update a first mode of the number of processing units to a second mode in which the number of processing units consumes less power than in the first mode. In at least one embodiment, the system includes one or more of a control system for an autonomous or semi-autonomous machine; a perception system for an autonomous or semi-autonomous machine; a system for performing simulation operations; a system for performing deep learning operations; a system for generating synthetic data; a system for generating multi-dimensional assets using a collaborative content platform; a system implemented using an edge device; a system implemented using a robot; a system incorporating one or more virtual machines (VMs); a system implemented at least partially in a data center; or a system implemented at least partially using cloud computing resources.

In another embodiment, a processor includes one or more processing units to determine a set of features from core usage data for a first time period, and predict a CPU core requirement for a subsequent period using an ML model and the set of features. The processor can output an indication of a number of processing units to be powered down (e.g., placed in a lower power state) during the subsequent period. The set of features is determined based on core usage data corresponding to the one or more processing units.

In at least one embodiment, the idle-core identification system 102 can collect and store historical core usage data 108 in the data store 110 and use the historical core usage data 108 to train the ML model 106 to predict a CPU core requirement for a subsequent period (e.g., next hour). Based on the CPU core requirement, the idle-core identification system 102 can determine how many processing units are needed to be powered (or a number of cores to be powered down) using features extracted from the core usage data 108. The ML model 106 can identify various hidden patterns in the historical core usage data and use a current pattern in newly collected core usage data 108 to determine the core requirement of the computing device 116. In at least one embodiment, the ML model 106 is trained using historical core usage data and ground truth data. In at least one embodiment, the ML model 106 may be one or more of a logistics regression model, a k-nearest neighbor model, a random forest regression model, a gradient boost model, or an Extreme Gradient Boost (XGBoost) model. Alternatively, other types of ML models can be used. The trained ML model 106 can be deployed as an object to a second computing device operatively coupled to the computing device 116. Additional details of the training and deployment of the ML model 106 are described below with respect to FIG. 9, FIG. 12A, FIG. 12B, and FIG. 18 to FIG. 19.

FIG. 2 illustrates a method 200 of identifying and powering down idle cores in accordance with one embodiment. Method 200 can be performed by processing logic comprising hardware, software, firmware, or any combination thereof. The processing logic can be implemented in one or more computing devices. In at least one embodiment, method 200 is performed by idle-core identification system 102 of FIG. 1A or FIG. 1B. In another embodiment, the method 200 is performed by the processing device 104 of FIG. 1A.

Referring to FIG. 2, the processing logic begins the method 200 by determining, using a computing device comprising a set of cores, a set of processes executed by the computing device (block 202). The set of processes can include one or more applications, jobs, tasks, routines, or the like. At block 204, the processing logic determines, using an ML model, a number of cores of the set of cores to be powered down based at least on the set of processes. The ML model can be a random forest regression model, an SVM, or the like. In at least one embodiment, the ML model is trained using historical core utilization data for at least one process of the set of processes. In at least one embodiment, the ML model is deployed as an object to a second computing device operatively coupled to the computing device. In at least one embodiment, the ML model is trained using historical core utilization data for each process during a first amount of time, and the number of cores is updated to the second mode for a second amount of time. In at least one embodiment, the first amount of time and the second amount of time may be the same or substantially the same duration or increment of time. In at least one embodiment, the first and second amounts of time are different.

In at least one embodiment, the processing logic, at block 204, predicts core utilization data that the set of processes will use for a subsequent period using the ML model. Once the core utilization data is predicted, the processing logic can use the predicted core utilization data to determine the number of cores of the set of cores to be powered down.

The processing logic updates a first mode of the number of cores to a second mode in which the number of cores consumes less power than in the first mode (block 206). In one embodiment, the first mode can be a performance mode, and the second mode can be a power-savings mode. In another embodiment, the first mode can be a first power mode, and the second mode can be a second power mode that has reduced power consumption as compared to the first power mode. In at least one embodiment, the first mode is an active mode, and the second mode is a sleep mode. In a further embodiment, the method 200 is repeated at a fixed interval.

In at least one embodiment, the set of processes includes at least a first process and a second process, and the processing logic, at block 204, predicts a first number of cores to be utilized by the first process using the ML model and predicts a second number of cores to be utilized by the second process using the ML model. The processing logic subtracts the first number and the second number from a total number of available cores to obtain the number of cores to be powered down. In at least one embodiment, the total number of available cores is less than a total number of cores in the set of cores.

In at least one embodiment, the processing logic, at block 204, predicts the first number of cores to be utilized by the first process for a next time period and the second number of cores to be utilized by the second process for the next time period. The number of cores is updated to the second mode for the next time period. The ML model is trained using historical core utilization data for the first process and the second process during one or more previous time periods.

In at least one embodiment, the processing logic determines a second set of processes executed by the computing device at a second time subsequent to the updating the number of cores to the second mode. The processing logic determines, using the ML model, a second number of cores of the set of cores to be powered down based on the second set of processes. The processing logic updates the first mode of the second number of cores to the second mode. The second number of cores at the second time can be different than a first number of cores updated at a first time.

In at least one embodiment, the processing logic collects core utilization data for each process executed by the computing device during a first time period. The core utilization data includes, for each process, a process identifier, a count of utilized cores, and a timestamp. The processing logic stores the core utilization data for each process as historical core utilization data in a database operatively coupled to the computing device. The ML model is trained or retrained using the historical core utilization data for at least one process of the set of processes.

Figure 3:
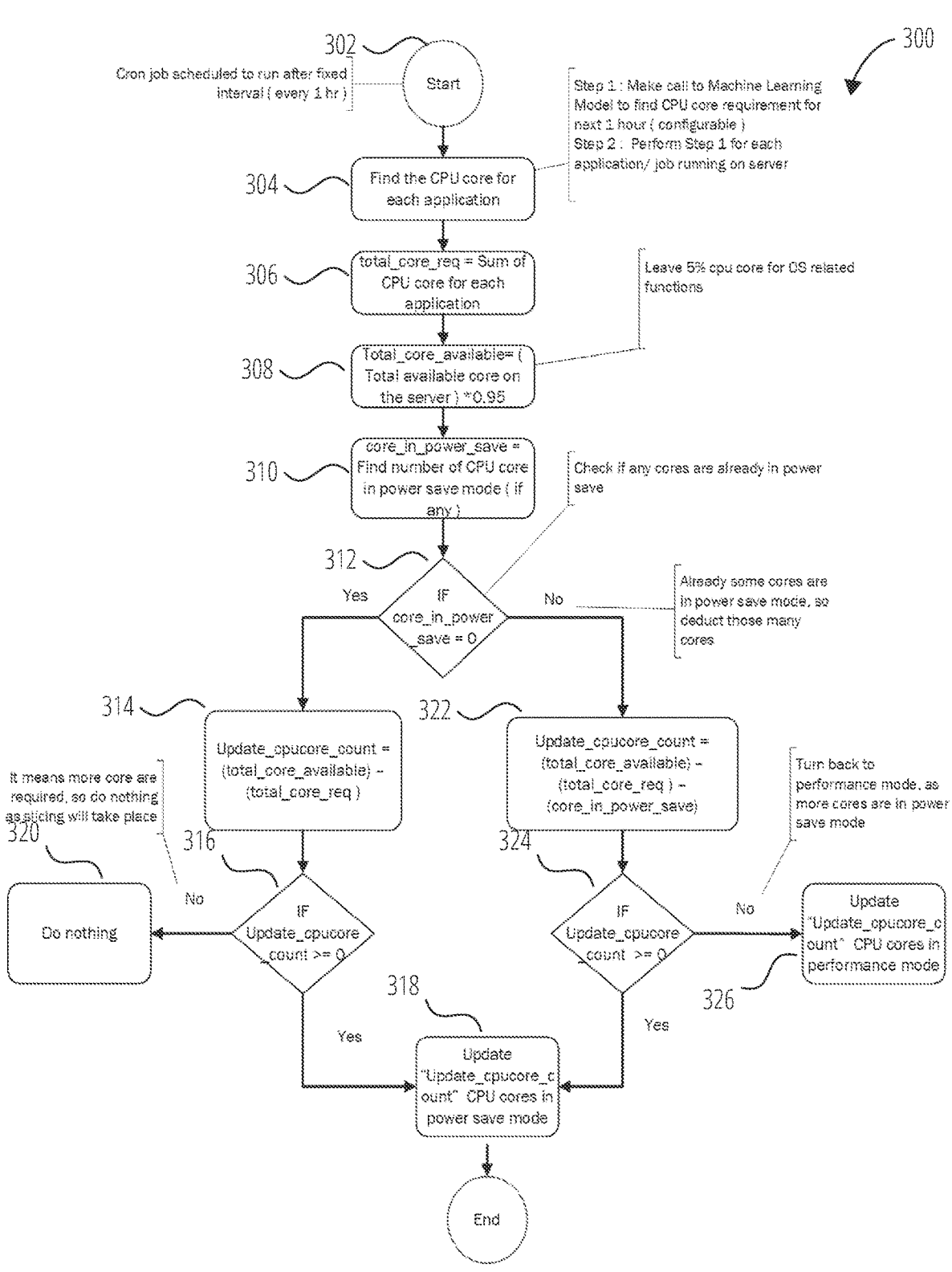
FIG. 3 illustrates a method of identifying and powering down idle cores in accordance with one embodiment.

FIG. 3 illustrates a method 300 of identifying and powering down idle cores in accordance with one embodiment. Method 300 can be performed by processing logic comprising hardware, software, firmware, or any combination thereof. The processing logic can be implemented in one or more computing devices. In at least one embodiment, method 300 is performed by idle-core identification system 102 of FIG. 1A to FIG. 1B. In another embodiment, the method 300 is performed by the processing device 104 of FIG. 1A.

Referring to FIG. 3, the processing logic begins the method 300 by scheduling a cron job to run after a fixed interval (e.g., every 1 hour) (block 302). At the fixed interval, the cron job can cause the processing logic to find the CPU core requirement for each application (block 304). In at, the processing logic can make a call to the ML model 106 to find a CPU core requirement for the next 1 hour (configurable). The processing logic can perform this operation for each application/job running on a server. The processing logic determines a total CPU core requirement by summing each of the CPU cores for each application (block 306). The processing logic can determine a total number of available cores by multiplying a total number of cores on the server by a multiplier, such as 95% (block 308). The processing logic can determine a number of cores already in a power-saving mode (block 310). The processing logic determines whether the number of cores already in the power-saving mode is equal to zero (block 312). This may be the case for the first instance of performing method 300. If the number of cores already in the power-saving mode is equal to zero at block 312, the processing logic determines a number of cores to be powered down by subtracting the total CPU core requirement from the total number of available cores (block 314). The processing logic determines whether the number of cores to be powered down greater than zero (block 316). If the number of cores to be powered down is greater than zero at block 316, the processing logic updates this number of cores to the power-saving mode (block 318). If the number of cores to be powered down is not greater than zero at block 316, the processing logic can refrain from taking action (block 320). This situation can occur because more cores are required in the performance mode. In this scenario, slicing can take place to utilize all of the cores between applications/processes in a time-sliced manner.

If the number of cores already in the power-saving mode is equal to not equal to zero at block 312, the processing logic determines a number of cores to be powered down by subtracting the total CPU core requirement and the number of cores already in the power-saving mode from the total number of available cores (block 322). The processing logic determines whether the number of cores to be powered down is equal to or greater than zero (block 324). If the number of cores to be powered down is greater than zero at block 324, the processing logic updates this number of cores to the power-saving mode (block 318). If the number of cores to be powered down is not greater than zero at block 324, the processing logic can update a number of cores in performance mode (block 326). This situation can occur because more cores are required in the performance mode.

Figure 4:
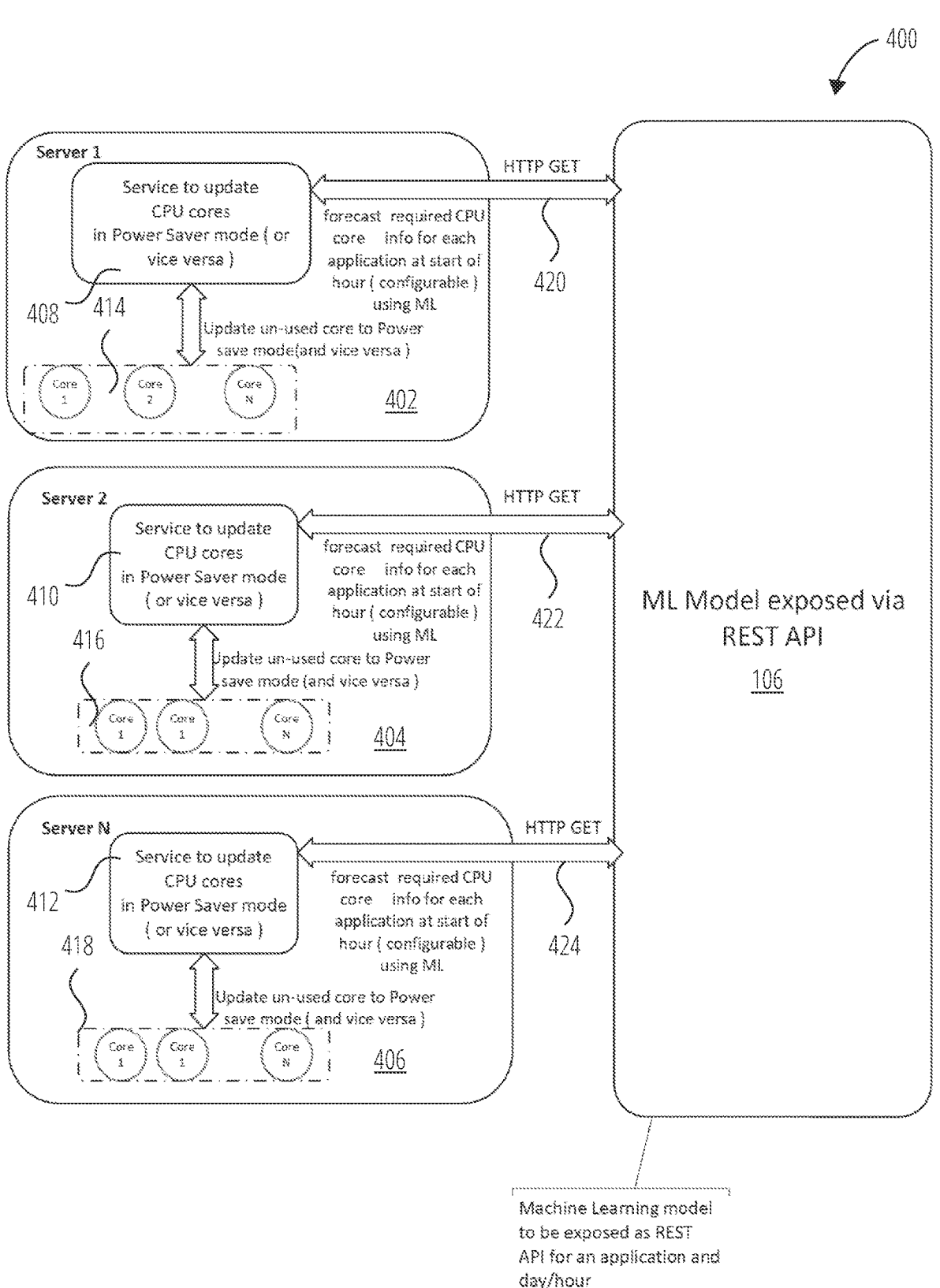
FIG. 4 is a block diagram of a data center with multiple servers, each with a service to update CPU cores in a power-saving mode, according to at least one embodiment.

FIG. 4 is a block diagram of a data center 400 with multiple servers, each with a service to update CPU cores in a power-saving mode, according to at least one embodiment. The data center 400 includes a first server 402, a second server 404, and up to an Nth server 406. It should be noted that although three servers and three services are illustrated, any number of servers and services can be used.

The first server 402 has a first service 408 that can update a first set of cores 414 to be in a power-saving mode or a performance mode, as described herein. The first service 408 can send an HTTP GET request 420 to the ML model 106 to obtain the CPU core requirement information for each application executing on the first set of cores 414 at a start of a period (e.g., every hour). The ML model 106 can be exposed as a REST API for an application and day/hour. That is, the HTTP GET request 420 can include one or more application identifiers for a given period, the one or more application identifiers corresponding to the one or more applications executing on the first set of cores 414 for the next period. The ML model 106 can predict the CPU core requirement for a given set of applications (or other processes) processes executing on the first set of cores 414 for the period (the next hour). The ML model 106 can respond to the HTTP GET request 420 with CPU core requirement information for the one or more application identifiers for the given period. The first service 408 can use the CPU core requirement information to update a subset of zero or more cores of the first set of cores 414 to the power-saving mode based on the CPU core requirement information provided by the ML model 106.

The second server 404 has a second service 410 that can update a second set of cores 416 to be in a power-saving mode or a performance mode, as described herein. The second service 410 can send an HTTP GET request 422 to the ML model 106 to obtain the CPU core requirement information for each application executing on the second set of cores 416 at a start of a period (e.g., every hour). The HTTP GET request 422 can include one or more application identifiers for a given period, the one or more application identifiers corresponding to the one or more applications executing on the second set of cores 416 for the next period. The ML model 106 can predict the CPU core requirement for the given set of applications executing on the second set of cores 416 for the period (the next hour). The ML model 106 can respond to the HTTP GET request 422 with CPU core requirement information for the one or more application identifiers for the given period. The second service 410 can use the CPU core requirement information to update a subset of zero or more cores of the second set of cores 416 to the power-saving mode based on the CPU core requirement information provided by the ML model 106.

The Nth server 406 has an Nth service 412 that can update an Nth set of course 418 to be in a power-saving mode or a performance mode, as described herein. The Nth service 412 can send an HTTP GET request 424 to the ML model 106 to obtain the CPU core requirement information for each application executing on the Nth set of course 418 at a start of a period (e.g., every hour). The HTTP GET request 424 can include one or more application identifiers for a given period, the one or more application identifiers corresponding to the one or more applications executing on the Nth set of course 418 for the next period. The ML model 106 can predict the CPU core requirement for the given set of applications executing on the Nth set of course 418 for the period (the next hour). The ML model 106 can respond to the HTTP GET request 424 with CPU core requirement information for the one or more application identifiers for the given period. The Nth service 412 can use the CPU core requirement information to update a subset of zero or more cores of the Nth set of course 418 to the power-saving mode based on the CPU core requirement information provided by the ML model 106.

Figure 5:
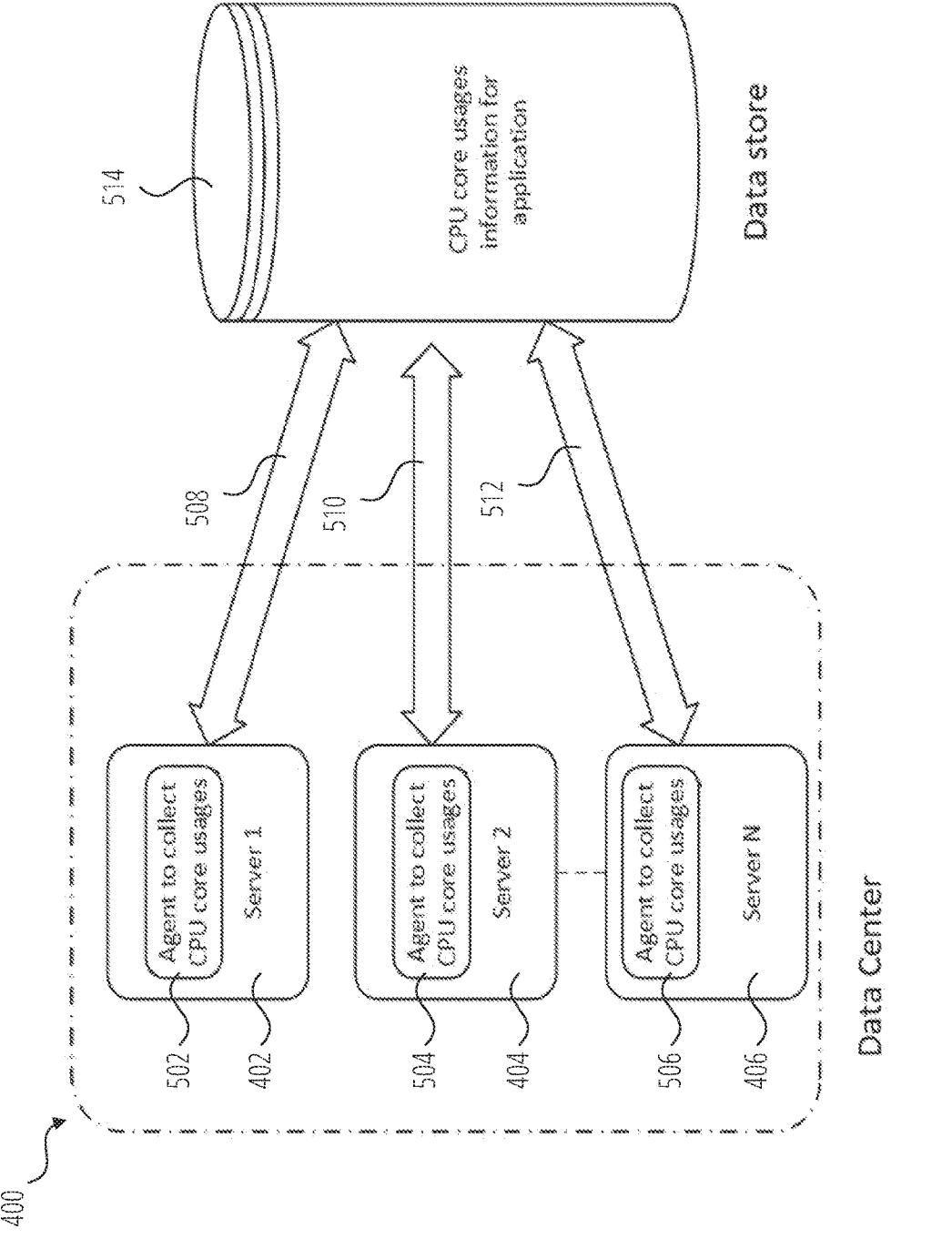
FIG. 5 is a block diagram of a data center with multiple servers, each with an agent to collect CPU usage data, according to at least one embodiment.

FIG. 5 is a block diagram of a data center 400 with multiple servers, each with an agent to collect CPU usage data, according to at least one embodiment. The data center 400 includes the first server 402, the second server 404, and up to the Nth server 406. It should be noted that although three servers and three services are illustrated, any number of servers and services can be used. The first server 402 has a first collection agent 502 that can collect CPU usage data 508 and send the CPU usage data 508 to a data store 514. The second server 404 has a second collection agent 504 that can collect CPU usage data 510 and send the CPU usage data 510 to the data store 514. The Nth server 406 has an Nth collection agent 506 that can collect CPU usage data 512 and send the CPU usage data 512 to the data store 514. The data store 514 can be similar to the data store 110. The CPU usage data 508 can include a processor identifier, a process name, a number of CPU cores running, and a timestamp. In at least one embodiment, the CPU usage data 508 includes an application identifier, an application name, a CPU core requirement, and a timestamp, as illustrated in table 600 of FIG. 6.

FIG. 6 illustrates a table 600 with core usage data according to at least one embodiment. As described above, the idle-core identification system 102 collects core utilization data (e.g., core usage data 108) for each process executed by the computing device during a first time period. The core utilization data can include, for each application, an application identifier 602, an application name 604, a CPU core requirement 606, and a timestamp 608. The table 600 can include these in separate columns, and each row contains corresponding values of each of the applications. In other embodiments, the table 600 can identify other processes, such as jobs, routines, tasks, or the like.

The core utilization data can include, for each process, a process identifier, a count of utilized cores, and a timestamp, such as illustrated in FIG. 6.

Figure 7:
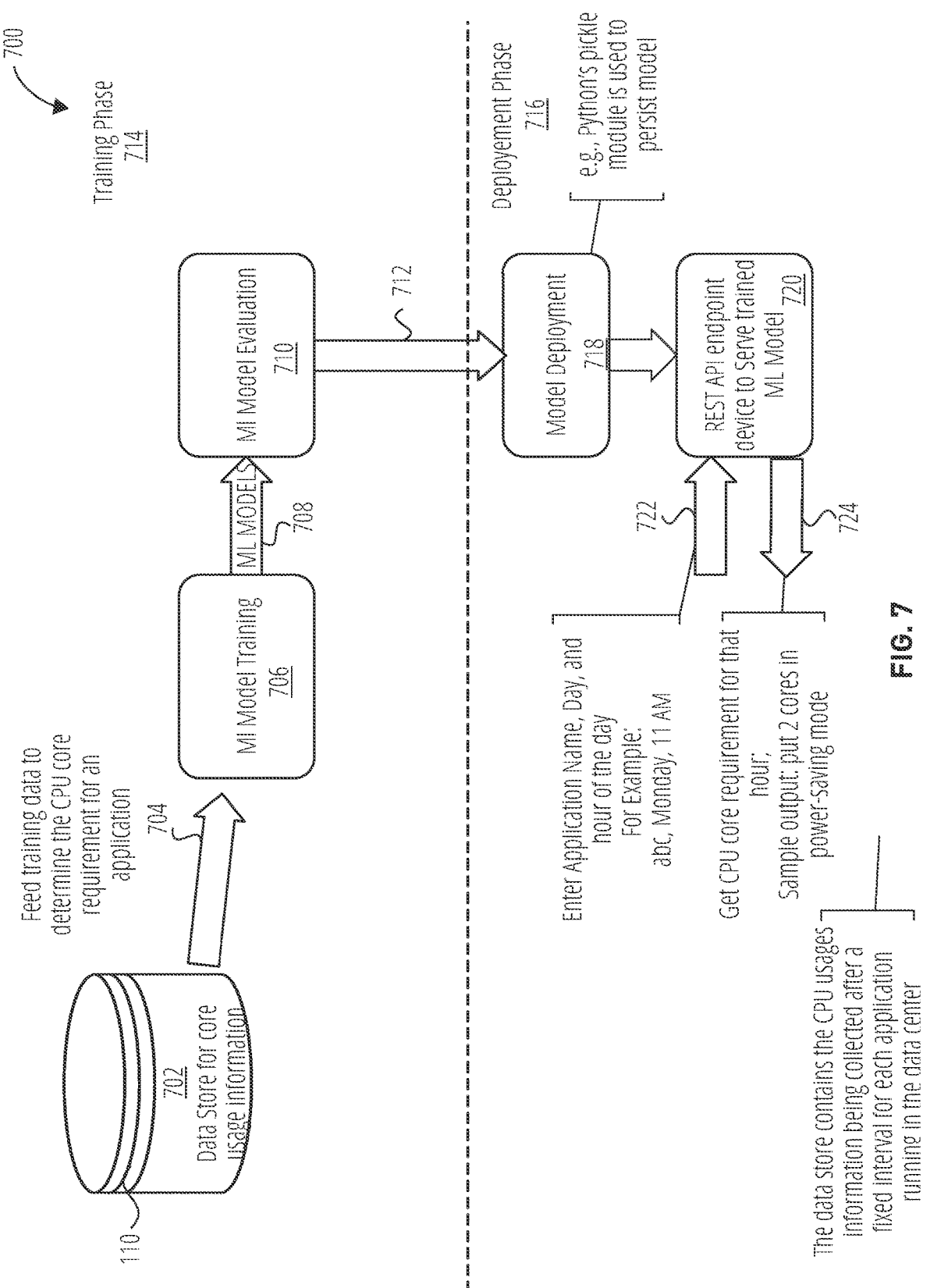
FIG. 7 is an example data flow diagram of a process for identifying and powering down idle cores, according to at least one embodiment.

FIG. 7 is an example data flow diagram of a process 700 for identifying and powering down idle cores, according to at least one embodiment. Process 700 can be performed by processing logic comprising hardware, software, firmware, or any combination thereof. The processing logic can be implemented in one or more computing devices, such as a first device for training an ML model and a second device for using the trained mode for predictions. In at least one embodiment, process 700 is performed by idle-core identification system 102 of FIG. 1A to FIG. 1B. In another embodiment, the process 700 is performed by the processing device 104 of FIG. 1A.

In at least one embodiment, the process 700 includes a pipeline with a training phase 714 and a deployment phase 716. During the training phase 714, the processing logic can perform operations for data preparation of relevant features for training an ML model. In at least one embodiment, the data store 110 stores the core usage information collected at configured intervals by the collection agent 130. In at least one embodiment, the processing logic aggregates the core usage information into a set of features 704 for a given period (e.g., each hour of a given date). The processing logic can input the set of features 704 of a given period for the given period into the ML model training at block 706.

In at least one embodiment, the ML model training at block 706 can train one or more ML models 708 to be evaluated by the ML model evaluation at block 710. In at least one embodiment, the one or more trained ML models 708 can include one or more of a logistics regression model, a k-nearest neighbor model, a random forest regression model, an SVM, a gradient boost model, or an XGBoost. Alternatively, other ML models can also be used.

In at least one embodiment, the ML model evaluation at block 710 can evaluate the one or more trained ML models 708. In at least one embodiment, the ML model evaluation techniques can include R Square, Adjusted R Square, Mean Square Error (MSE), Root Mean Square Error (RMSE), Mean Absolute Error (MAE), or the like. Once trained at ML model evaluation block 710, a trained ML model 712 is deployed. The trained ML model 712 is similar to ML model 106 of FIG. 1A.

In at least one embodiment, the machine learning pipeline can include data preparation, ML model training, ML model evaluation, and ML model deployment. As part of the data preparation, the core usage data is aggregated as feature attributes. For the ML model training, the feature attributes are used as inputs.

Once trained in the training phase 714, the trained ML model 712 can be persisted as an object by serialization/deserialization of the ML model 106 (e.g., using Python Pickle library or other serialization/deserialization technologies) in the deployment phase 716 (block 718). In the deployment phase 716, the object can be deployed to an endpoint device, such as described above as the ML model 106 deployed on the processing device 104 of FIG. 1A (block 720). In at least one embodiment, the object is used to serve the ML model 106 using an interface, such as a REST API. In at least one embodiment, the REST APIs are exposed to users (e.g., administrators of the data center 100), where a user can pass the feature attributes (e.g., application name) for a specified period (e.g., a given hour/day) as input 722. The REST API can return a response 724 with an indication of the CPU core requirement of the computing device for the specified period (e.g., the given hour/day). In at least one embodiment, the ML model 106 is persisted using Python's pickle library, such as represented in the following example:

```
import pickle
model.fit(X_train, Y_train)
#save the model to disk
```

```
filename='model_final.sav'
pickle.dump(model, open(filename, 'wb'))
#load the model from disk
loaded_model=pickle.load(open(filename, 'rb'))
result=loaded_model.score(X_test, Y_test)
```

The ML model 106 is served using example Python modules below to load the persisted module and expose as REST API:

```
#Import Module
from flask import Flask, jsonify, request
from flask_cors import CORS
import joblib
import json
import logging
#Load the previously trained model from pkl file
model=joblib.load('pkl_file_path')
temp_y_preds=model.predict(temp_X_test)
```

In at least one embodiment, the processing logic can use a summary job to make a call to REST API endpoint devices and store a mode status (power of performance modes) of each core of the computing device for each hour/day or other specified time periods. The summary job can use a UI dashboard 128 to provide visualization of the idle cores of the computing devices, such as described below with respect to FIG. 8. The UI dashboard 300 can include a list of idle cores for a previous day, continuous idle cores for a last N number of days, a list of idle cores for a given data range, or the like. The UI dashboard 128 can also provide a mechanism for a user (e.g., administrator) to enter a device name and specified date/time period to find whether the corresponding computing device is idle or busy.

In other embodiments, the ML model can be a neural network, such as a deep neural network. Additional details of neural network training and deployment are described below with respect to FIG. 9.

FIG. 8 is a table 800 of power consumption savings in powering down cores in the power-saving mode according to various embodiments. The table 800 includes columns with metrics 802, power consumption (watts) 804, and percent savings against performance mode 806 in a system with 128 cores and 256 Gigabytes (GBs) of memory. The first row indicates the power consumption (watts) 804 and percent savings against performance mode 806 when all cores are in performance mode. The second row indicates the power consumption (watts) 804 and percent savings against performance mode 806 when 25% of the cores are in power-saving mode. The third row indicates the power consumption (watts) 804 and percent savings against performance mode 806 when 50% of the cores are in power-saving mode. The fourth row indicates the power consumption (watts) 804 and percent savings against performance mode 806 when 75% of the cores are in power-saving mode. The fifth row indicates the power consumption (watts) 804 and percent savings against performance mode 806 when 100% of the cores are in power-saving mode. As illustrated in FIG. 8, there is a power savings of 5.43%, with 50% of the cores in power-saving mode.

Neural Network Training and Deployment

Figure 9:
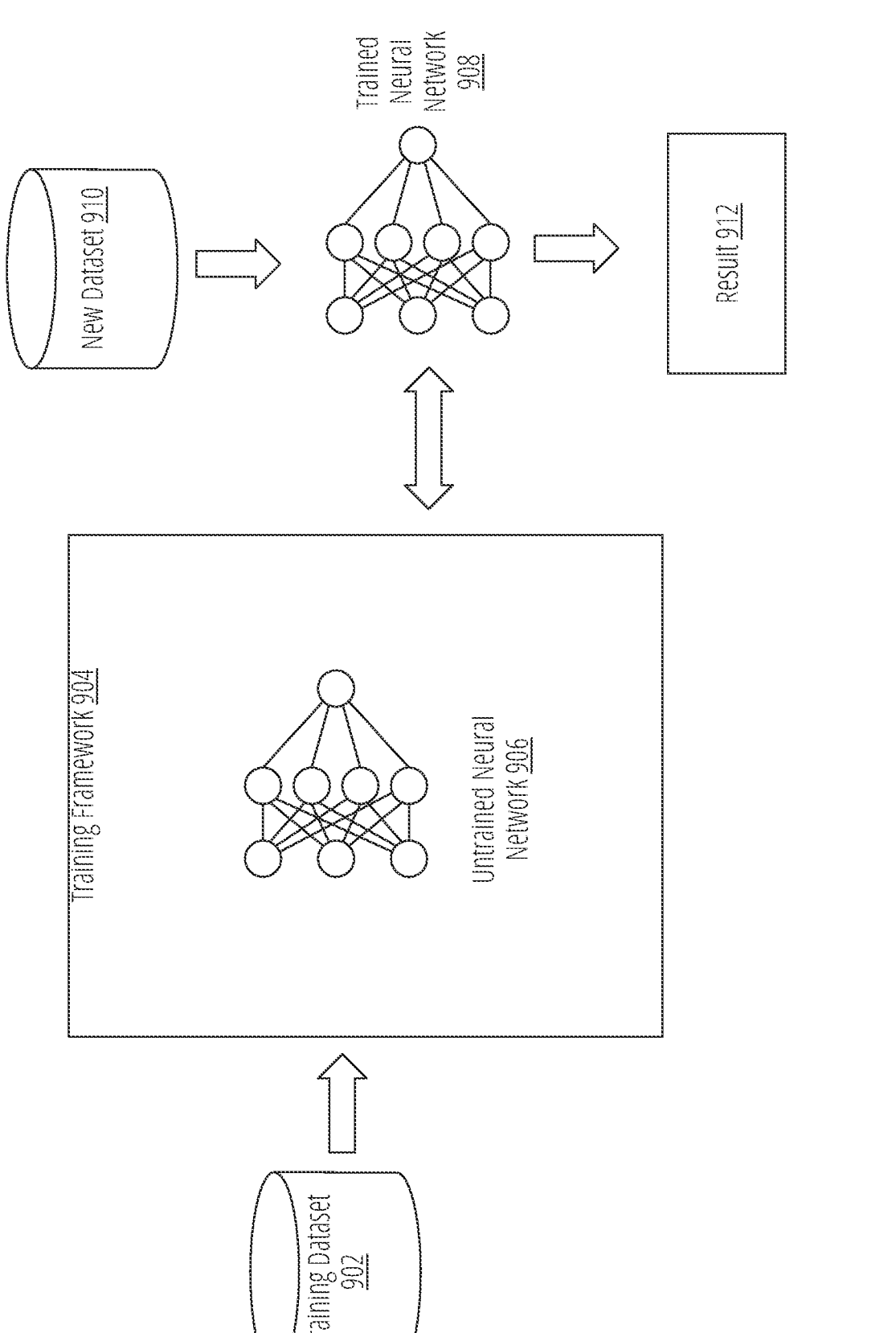
FIG. 9 illustrates the training and deployment of a neural network, according to at least one embodiment.

FIG. 9 illustrates training and deployment of a deep neural network, according to at least one embodiment. In at least one embodiment, untrained neural network 906 is trained using a training dataset 902. In at least one embodiment, training framework 904 is a PyTorch framework, whereas in other embodiments, training framework 904 is a Tensor- Flow, Boost, Caffe, Microsoft Cognitive Toolkit/CNTK, MXNet, Chainer, Keras, Deeplearning4j, or other training frameworks. In at least one embodiment, training framework 904 trains an untrained neural network 906 and enables it to be trained using processing resources described herein to generate a trained neural network 908. In at least one embodiment, weights may be chosen randomly or by pre-training using a deep belief network. In at least one embodiment, training may be performed in either a supervised, partially supervised, or unsupervised manner.

In at least one embodiment, untrained neural network 906 is trained using supervised learning, wherein training dataset 902 includes an input paired with a desired output for an input, or where training dataset 902 includes input having a known output and an output of neural network 906 is manually graded. In at least one embodiment, untrained neural network 906 is trained in a supervised manner and processes inputs from training dataset 902, and compares resulting outputs against a set of expected or desired outputs. In at least one embodiment, errors are propagated back through untrained neural network 906. In at least one embodiment, training framework 904 adjusts weights that control untrained neural network 906. In at least one embodiment, training framework 904 includes tools to monitor how well untrained neural network 906 is converging towards a model, such as trained neural network 908, suitable to generating correct answers, such as in result 912, based on input data such as a new dataset 910. In at least one embodiment, training framework 904 trains untrained neural network 906 repeatedly while adjusting weights to refine an output of untrained neural network 906 using a loss function and adjustment algorithm, such as stochastic gradient descent. In at least one embodiment, training framework 904 trains untrained neural network 406 until untrained neural network 906 achieves a desired accuracy. In at least one embodiment, trained neural network 908 can then be deployed to implement any number of machine learning operations.

In at least one embodiment, untrained neural network 906 is trained using unsupervised learning, wherein untrained neural network 906 attempts to train itself using unlabeled data. In at least one embodiment, unsupervised learning training dataset 902 will include input data without any associated output data or "ground truth" data. In at least one embodiment, untrained neural network 906 can learn groupings within training dataset 902 and determine how individual inputs are related to untrained dataset 902. In at least one embodiment, unsupervised training can be used to generate a self-organizing map in trained neural network 908 capable of performing operations useful in reducing the dimensionality of new dataset 910. In at least one embodiment, unsupervised training can also be used to perform anomaly detection, which allows the identification of data points in new dataset 910 that deviate from normal patterns of new dataset 910.

In at least one embodiment, semi-supervised learning may be used, which is a technique in which training dataset 902 includes a mix of labeled and unlabeled data. In at least one embodiment, training framework 904 may be used to perform incremental learning, such as through transferred learning techniques. In at least one embodiment, incremental learning enables trained neural network 908 to adapt to new dataset 910 without forgetting knowledge instilled within trained neural network 908 during initial training.

Identifying Idle Cores

FIG. 10 is a flow diagram of a method 1000 of identifying and powering down idle cores, according to at least one embodiment. Method 1000 can be performed by processing logic comprising hardware, software, firmware, or any combination thereof. In at least one embodiment, method 1000 is performed by idle-core identification system 102 of FIG. 1A to FIG. 1A. In another embodiment, method 1000 is performed by the processing device 104 of FIG. 1A. In at least one embodiment, method 1000 is performed by inference and/or training logic 1208. Details regarding inference and/or training logic 1208 (e.g., hardware structure(s)) are provided herein in conjunction with FIG. 12A and/or FIG. 12B.

Referring to FIG. 10, method 1000 begins by processing logic receiving core usage data for a computing device (block 1002). The processing logic determines a set of features from the core usage data for a first time period (block 1004). The processing logic uses an ML model and the set of features to predict or forecast a predicted core usage for a subsequent period (block 1006). The processing logic determines, using the predicted core usage, a number of idle cores of the computing device for the subsequent period (block 1008). In at least one embodiment, the number of idle cores is determined using the operations described above with respect to FIG. 3. The processing logic outputs an indication of the number of idle cores of the computing device (block 1010). In another embodiment, the processing logic outputs an indication of the number of active cores.

In a further embodiment, the core usage data include CPU usage data for each CPU core along with the associated application identifier or job identifier executed by the respective CPU core. In at least one embodiment, the set of features includes a device type of the computing device. For example, the device type can include a CPU type of a CPU of the computing device and a GPU type of a GPU of the computing device. In at least one embodiment, the set of features includes a device type of either a CPU or a GPU of the computing device.

In at least one embodiment, the processing logic trains the ML model using historical core usage data. In at least one embodiment, the processing logic deploys the ML model as an object to an endpoint device. In at least one embodiment, the ML model can be implemented as one or more of a logistics regression model, a k-nearest neighbor model, a random forest regression model, an SVM, a gradient boost model, an XGBoost model, or the like.

In at least one embodiment, the processing logic provides a UI dashboard. The UI dashboard presents an indication of the computing device being idle. In at least one embodiment, the UI dashboard presents an indication of a number of idle cores of the computing device. In another embodiment, the processing logic sends a message to an administrator of a data center containing the computing device or an administrator of the computing device.

Figure 11:
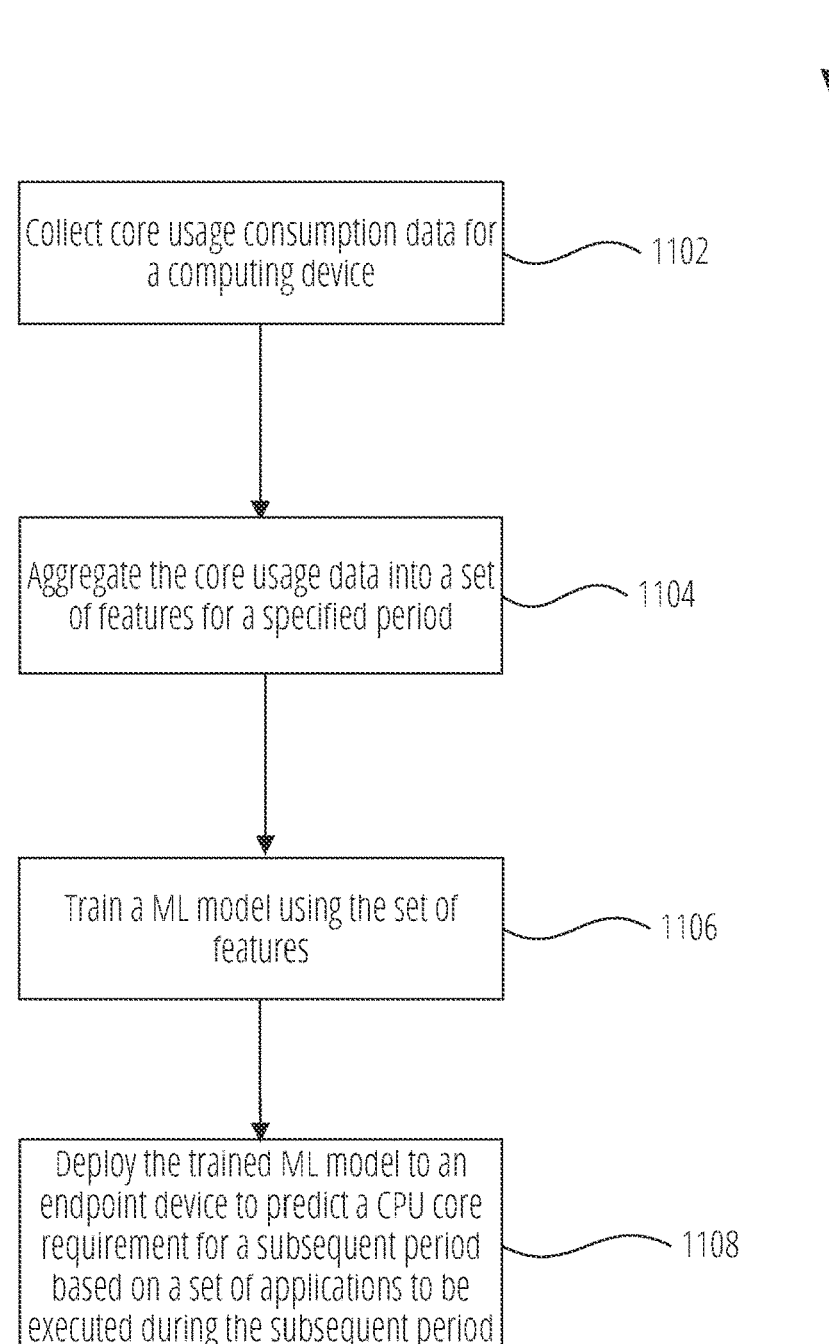
FIG. 11 is a flow diagram of a method of training a machine learning (ML) model for predicting a CPU core requirement of a computing device, according to at least one embodiment.

FIG. 11 is a flow diagram of a method 1100 of training an ML model for predicting a CPU core requirement of a computing device, according to at least one embodiment. Method 600 can be performed by processing logic comprising hardware, software, firmware, or any combination thereof. In at least one embodiment, method 1100 is performed by idle-core identification system 102 of FIG. 1A to FIG. 1A. In another embodiment, method 1100 is performed by the processing device 104 of FIG. 1A. In at least one embodiment, method 1100 is performed by inference and/or training logic 1208. Details regarding inference and/or training logic 1208 are provided herein in conjunction with FIG. 12A and/or FIG. 12B.

Referring to FIG. 11, method 1100 begins with the processing logic collecting core usage data for a computing device (block 1102). The processing logic aggregates the core usage data into a set of features (block 1104). The set of features includes at least a maximum power consumption value, a minimum power consumption value, and an average power consumption value for a specified period. The set of features can also include a device type of the computing device. The processing logic trains an ML model using the set of features (block 1106). The processing logic deploys the trained ML model to an endpoint device to predict a CPU core requirement of an identified computing device based on a set of applications to be executed during a subsequent period(block 1108).

In a further embodiment, the processing logic receives core usage data associated with the identified computing device to be used for predictions or forecasts. The processing logic aggregates the core usage data into a set of features for a specified period. Using the trained ML model and the set of features, the processing logic predicts the CPU core requirement for the subsequent period. The processing logic can use the CPU core requirement to determine a number of idle cores. In at least one embodiment, the number of idle cores can be determined using the operations described above with respect to FIG. 3. The processing logic outputs an indication of the number of idle cores.

Inference and Training Logic

Figure 12A:
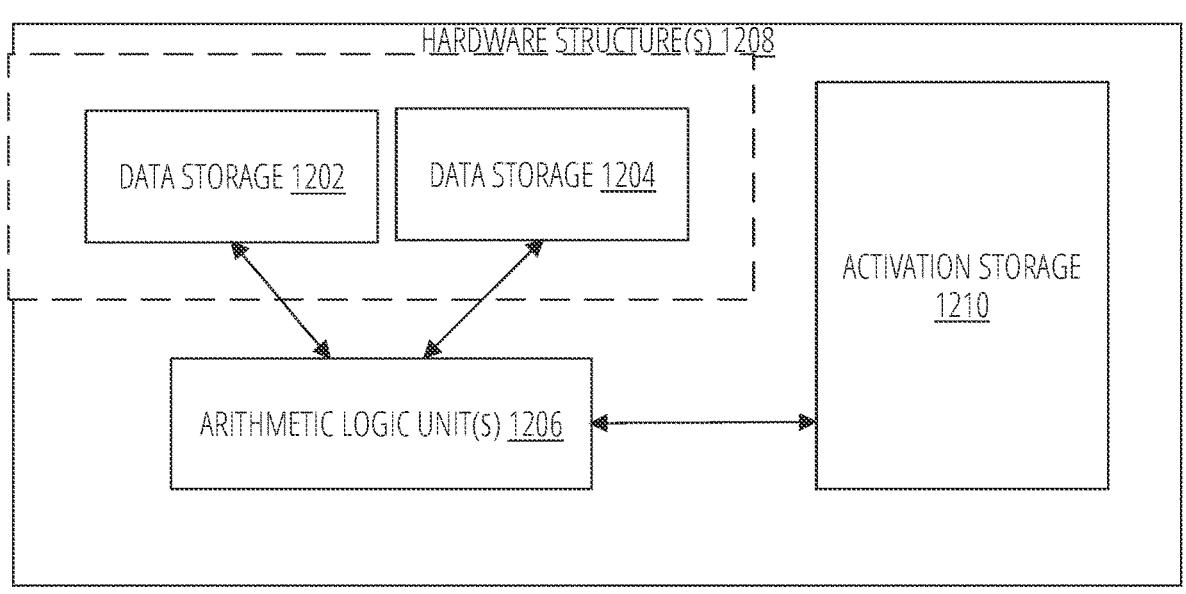
FIG. 12A illustrates inference and/or training logic, according to at least one embodiment.

FIG. 12A illustrates inference and/or training logic 1208 used to perform inferencing and/or training operations associated with one or more embodiments. Details regarding inference and/or training logic 1208 are provided below in conjunction with FIG. 12A and/or FIG. 12B.

In at least one embodiment, inference and/or training logic 1208 may include, without limitation, code storage and/or data storage 1202 to store forward and/or output weight and/or input/output data, and/or other parameters to configure neurons or layers of a neural network trained and/or used for inferencing in aspects of one or more embodiments. In at least one embodiment, training logic 1208 may include, or be coupled to code and/or data storage 1202 to store graph code or other software to control the timing and/or order, in which weight and/or other parameter information is to be loaded to configure, logic, including integer and/or floating point units (collectively, arithmetic logic units (ALUs) 1206. In at least one embodiment, code, such as graph code, loads weight or other parameter information into processor ALUs based on an architecture of a neural network to which the code corresponds. In at least one embodiment, code and/or data storage 1202 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1202 may be included with other on-chip or off-chip data storage 1202, including a processor's L1, L2, or L3 cache or system memory.

In at least one embodiment, any portion of code and/or data storage 1202 may be internal or external to one or more processors or other hardware logic devices or circuits. In at least one embodiment, code and/or code and/or data storage may be cache memory, dynamic randomly addressable memory ("DRAM"), static randomly addressable memory ("SRAM"), non-volatile memory (e.g., Flash memory), or other storage. In at least one embodiment, the choice of whether code and/or code and/or data storage is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1208 may include, without limitation, a code and/or data storage 1204 to store backward and/or output weight and/or input/output data corresponding to neurons or layers of a neural network trained and/or used for inferencing in aspects of one or more embodiments. In at least one embodiment, code and/or data storage 1204 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1208 may include, or be coupled to code and/or data storage 1204 to store graph code or other software to control the timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1204 may be included with other on-chip or off-chip data storage, including a processor's L1, L2, or L3 cache or system memory. In at least one embodiment, any portion of code and/or data storage 1204 may be internal or external to one or more processors or other hardware logic devices or circuits. In at least one embodiment, code and/or data storage 1204 may be cache memory, DRAM, SRAM, non-volatile memory (e.g., Flash memory), or other storage. In at least one embodiment, the choice of whether code and/or data storage 1204 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1202 and code and/or data storage 1204 may be separate storage structures. In at least one embodiment, code and/or data storage 1202 and code and/or data storage 1204 may be the same storage structure. In at least one embodiment, code and/or data storage 1202 and code and/or data storage 1204 may be partially the same storage structure and partially separate storage structures. In at least one embodiment, any portion of code and/or data storage 1202 and code and/or data storage 1204 may be included with other on-chip or off-chip data storage, including a processor's L1, L2, or L3 cache or system memory.

In at least one embodiment, inference and/or training logic 1208 may include, without limitation, one or more arithmetic logic unit(s) ("ALU(s)") 1206, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1210 that are functions of input/output and/or weight parameter data stored in code and/or data storage 1202 and/or code and/or data storage 1204. In at least one embodiment, activations stored in activation storage 1210 are generated according to linear algebraic and or matrix-based mathematics performed by ALU(s) 1206 in response to performing instructions or other code, wherein weight values stored in code and/or data storage 1204 and/or code and/or data storage 1202 are used as operands along with other values, such as bias values, gradient information, momentum values, or other parameters or hyperparameters, any or all of which may be stored in code and/or data storage 1204 or code and/or data storage 1202 or another storage on or off-chip.

In at least one embodiment, ALU(s) 1206 are included within one or more processors or other hardware logic devices or circuits, whereas in another embodiment, ALU(s) 1206 may be external to a processor or other hardware logic device or circuit that uses them (e.g., a co-processor). In at least one embodiment, ALUs 1206 may be included within a processor's execution units or otherwise within a bank of ALUs accessible by a processor's execution units either within the same processor or distributed between different processors of different types (e.g., central processing units, graphics processing units, fixed function units, etc.). In at least one embodiment, code and/or data storage 1202, code and/or data storage 1204, and activation storage 1210 may be on the same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1210 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement, and/or other logical circuits.

In at least one embodiment, activation storage 1210 may be cache memory, DRAM, SRAM, non-volatile memory (e.g., Flash memory), or other storage. In at least one embodiment, activation storage 1210 may be completely or partially within or external to one or more processors or other logical circuits. In at least one embodiment, the choice of whether activation storage 1210 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1208 illustrated in FIG. 12A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1208 illustrated in FIG. 12A may be used in conjunction with central processing unit ("CPU") hardware, graphics processing unit ("GPU") hardware, or other hardware, such as field programmable gate arrays ("FPGAs").

Figure 12B:
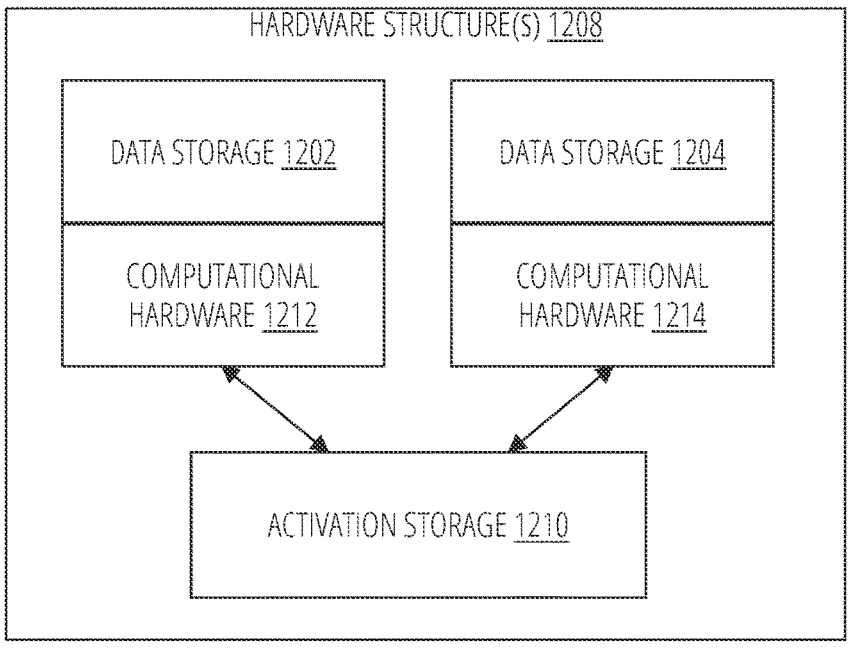
FIG. 12B illustrates inference and/or training logic, according to at least one embodiment.

FIG. 12B illustrates inference and/or training logic 1208, according to at least one or more embodiments. In at least one embodiment, inference and/or training logic 1208 may include, without limitation, hardware logic in which computational resources are dedicated or otherwise exclusively used in conjunction with weight values or other information corresponding to one or more layers of neurons within a neural network. In at least one embodiment, inference and/or training logic 1208 illustrated in FIG. 12B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1208 illustrated in FIG. 12B may be used in conjunction with central processing unit (CPU) hardware, graphics processing unit (GPU) hardware, or other hardware, such as field programmable gate arrays (FPGAs). In at least one embodiment, inference and/or training logic 1208 includes, without limitation, code and/or data storage 1202 and code and/or data storage 1204, which may be used to store code (e.g., graph code), weight values and/or other information, including bias values, gradient information, momentum values, and/or other parameter or hyperparameter information. In at least one embodiment illustrated in FIG. 12B, each of code and/or data storage 1202 and code and/or data storage 1204 is associated with a dedicated computational resource, such as computational hardware 1212 and computational hardware 1214, respectively. In at least one embodiment, each of computational hardware 1212 and computational hardware 1214 comprises one or more ALUs that perform mathematical functions, such as linear algebraic functions, only on information stored in code and/or data storage 1202 and code and/or data storage 1204, respectively, the result of which is stored in activation storage 1210.

In at least one embodiment, each of code and/or data storage 1202 and 1204 and corresponding computational hardware 1212 and 1214, respectively, correspond to different layers of a neural network, such that the resulting activation from one "storage/computational pair 1202/1212" of code and/or data storage 1202 and computational hardware 1212 is provided as an input to "storage/computational pair 1204/1214" of code and/or data storage 1204 and computational hardware 1214, in order to mirror the conceptual organization of a neural network. In at least one embodiment, each of the storage/computational pairs 1202/1212 and 1204/1214 may correspond to more than one neural network layer. In at least one embodiment, additional storage/computation pairs (not shown) subsequent to or in parallel with storage computation pairs 1202/1212 and 1204/1214 may be included in inference and/or training logic 1208.

Data Center

Figure 13:
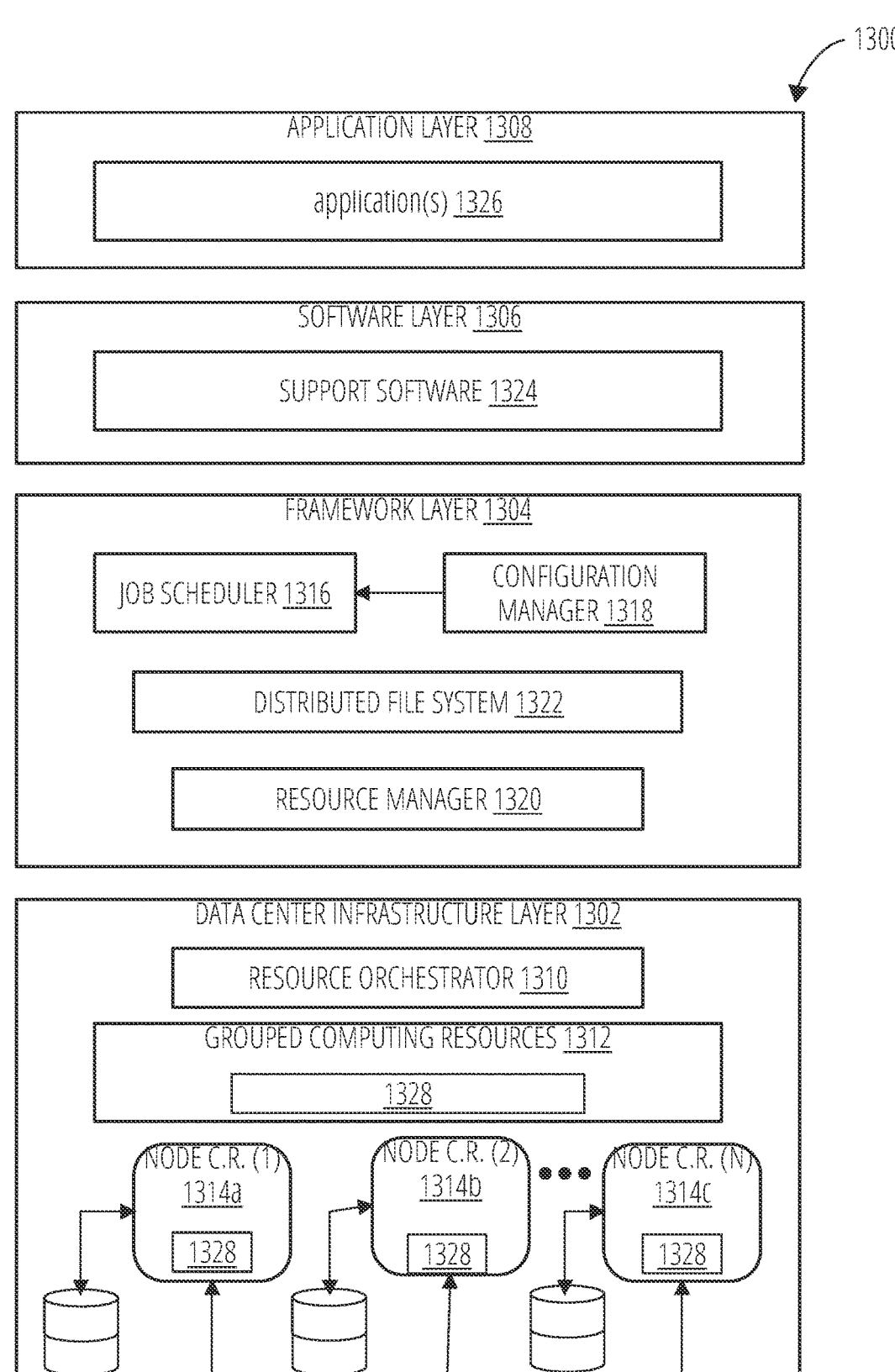
FIG. 13 illustrates an example data center system, according to at least one embodiment.

FIG. 13 illustrates an example data center 1300, in which at least one embodiment may be used. In at least one embodiment, data center 1300 includes a data center infrastructure layer 1302, a framework layer 1304, a software layer 1306, and an application layer 1308.

In at least one embodiment, as shown in FIG. 13, data center infrastructure layer 1302 may include a resource orchestrator 1310, grouped computing resources 1312, and node computing resources ("node C.R.s") 1314a(1)-1314b (N), where "N" represents any whole, positive integer. In at least one embodiment, node C.R.s 1314a(1)-1314b(N) may include, but are not limited to, any number of central processing units ("CPUs") or other processors (including accelerators, field-programmable gate arrays (FPGAs), graphics processors, etc.), memory devices (e.g., dynamic read-only memory), storage devices (e.g., solid-state or disk drives), network input/output ("NW I/O") devices, network switches, virtual machines ("VMs"), power modules, and cooling modules, etc. In at least one embodiment, one or more node C.R.s from among node C.R.s 1314*a*(1)-1314*b* (N) may be a server having one or more of the above-mentioned computing resources.

In at least one embodiment, grouped computing resources 1312 may include separate groupings of node C.R.s housed within one or more racks (not shown) or many racks housed in data centers at various geographical locations (also not shown). Separate groupings of node C.R.s within grouped computing resources 1312 may include grouped compute, network, memory or storage resources that may be configured or allocated to support one or more workloads. In at least one embodiment, several node C.R.s, including CPUs or processors, may be grouped within one or more racks to provide compute resources to support one or more workloads. In at least one embodiment, one or more racks may also include any number of power modules, cooling modules, and network switches, in any combination.

In at least one embodiment, resource orchestrator 1310 may configure or otherwise control one or more node C.R.s 1314*a*(1)-1314*b*(N) and/or grouped computing resources 1312. In at least one embodiment, the resource orchestrator 1310 may include a software design infrastructure ("SDI") management entity for data center 1300. In at least one embodiment, the resource orchestrator 1310 may include hardware, software, or some combination thereof.

In at least one embodiment, as shown in FIG. 13, framework layer 1304 includes a job scheduler 1316, a configuration manager 1318, a resource manager 1320, and a distributed file system 1322. In at least one embodiment, framework layer 1304 may include a framework to support software 1324 of software layer 1306 and/or one or more application(s) 1326 of application layer 1308. In at least one embodiment, support software 1324 or application(s) 1326 may respectively include web-based service software or applications, such as those provided by Amazon Web Services, Google Cloud, and Microsoft Azure. In at least one embodiment, framework layer 1304 may be, but is not limited to, a type of free and open-source software web application framework such as Apache Spark™ (hereinafter "Spark") that may utilize distributed file system 1322 for large-scale data processing (e.g., "big data"). In at least one embodiment, job scheduler 1316 may include a Spark driver to facilitate scheduling workloads supported by various layers of data center 1300. In at least one embodiment, configuration manager 1318 may be capable of configuring different layers, such as software layer 1306 and framework layer 1304, including Spark and distributed file system 1322, for supporting large-scale data processing. In at least one embodiment, resource manager 1320 may be capable of managing clustered or grouped computing resources mapped to or allocated for support of distributed file system 1322 and job scheduler 1316. In at least one embodiment, clustered or grouped computing resources may include grouped computing resources 1312 at data center infrastructure layer 1302. In at least one embodiment, resource manager 1320 may coordinate with resource orchestrator 1310 to manage these mapped or allocated computing resources.

In at least one embodiment, support software 1324 included in software layer 1306 may include software used by at least portions of node C.R.s 1314*a*(1)-1314*b*(N), grouped computing resources 1312, and/or distributed file system 1322 of framework layer 1304. The one or more types of software may include, but are not limited to, Internet web page search software, e-mail virus scan software, database software, and streaming video content software.

In at least one embodiment, application(s) 1326 included in application layer 1308 may include one or more types of applications used by at least portions of node C.R.s 1314*a* (1)-1314*b*(N), grouped computing resources 1312, and/or distributed file system 1322 of framework layer 1304. One or more types of applications may include, but are not limited to, any number of genomics applications, cognitive computing, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1318, resource manager 1320, and resource orchestrator 1310 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor-performing portions of a data center.

In at least one embodiment, data center 1300 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1300. In at least one embodiment, trained machine learning models corresponding to one or more neural networks may be used to infer or predict information using resources described above with respect to data center 1300 by using weight parameters calculated through one or more training techniques described herein.

In at least one embodiment, data center 1300 may use CPUs, application-specific integrated circuits (ASICs), GPUs, FPGAs, or other hardware to perform training and/or inferencing using the above-described resources. Moreover, one or more software and/or hardware resources described above may be configured as a service to allow users to train or perform inferencing of information, such as image recognition, speech recognition, or other artificial intelligence services.

Inference and/or training logic 1208 are used to perform inferencing and/or training operations associated with one or more embodiments. Details regarding inference and/or training logic 1208 are provided below in conjunction with FIG. 12A and/or FIG. 12B. In at least one embodiment, inference and/or training logic 1208 may be used in system FIG. 13 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve the performance of the network while limiting the amount of synthetic data to avoid overfitting.

Computer Systems

Figure 14:
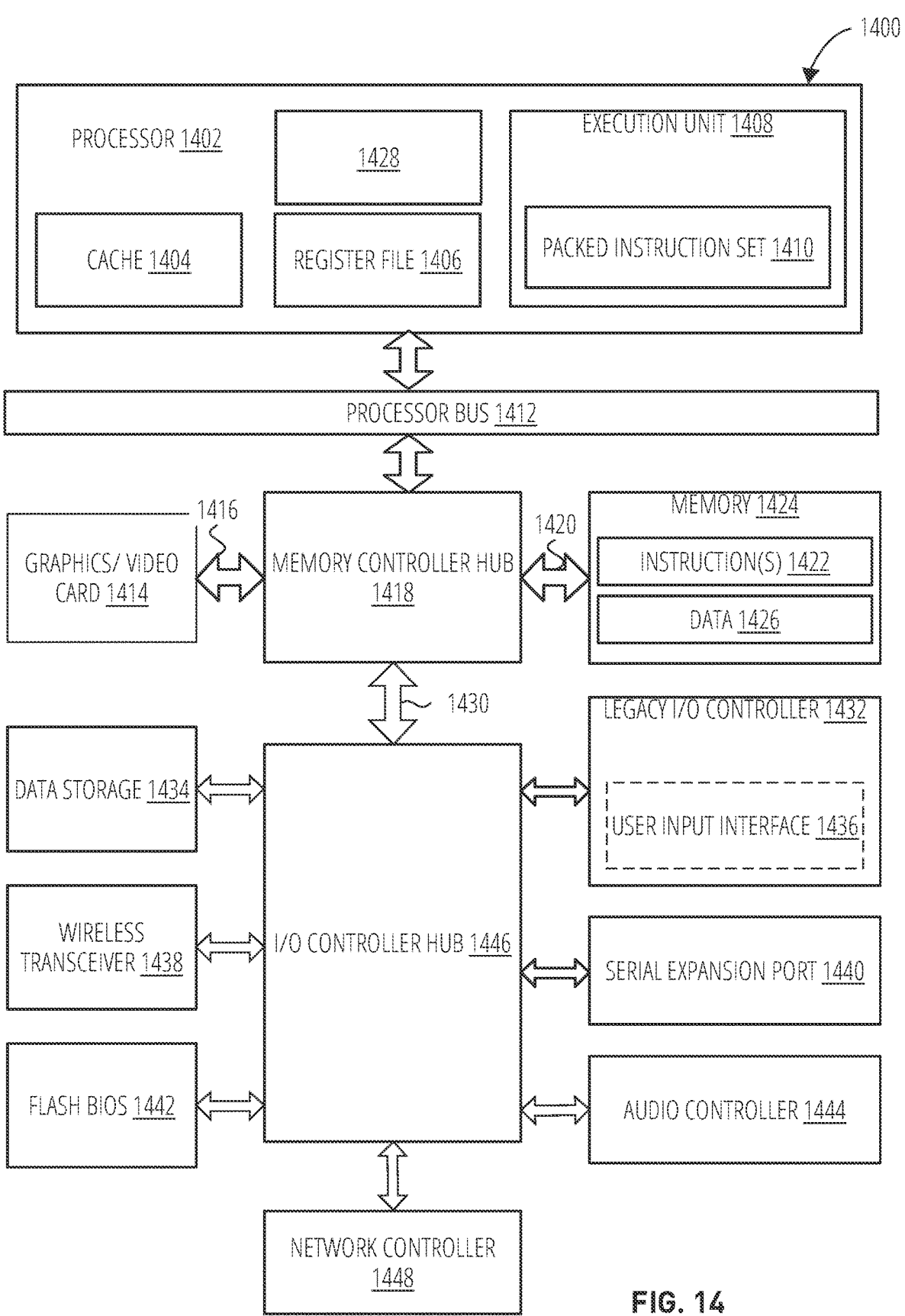
FIG. 14 illustrates a computer system, according to at least one embodiment.

FIG. 14 is a block diagram illustrating an exemplary computer system 1400, which may be a system with interconnected devices and components, a system-on-a-chip ("SOC"), or some combination thereof 1400 formed with a processor that may include execution units to execute an instruction, according to at least one embodiment. In at least one embodiment, computer system 1400 may include, without limitation, a component, such as a processor 1402, to employ execution units including logic to perform algorithms for process data, in accordance with the present disclosure, such as in the embodiments described herein. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1400 may execute a version of WINDOWS' operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), a system on a chip, network computers ("NetPCs"), set-top boxes, network hubs, wide area network ("WAN") switches, or any other system that may perform one or more instructions in accordance with at least one embodiment.

In at least one embodiment, computer system 1400 may include, without limitation, processor 1402 that may include, without limitation, one or more execution units 1408 to perform operations according to techniques described herein. In at least one embodiment, computer system 1400 is a single-processor desktop or server system, but in another embodiment, the computer system 1400 may be a multiprocessor system. In at least one embodiment, processor 1402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1402 may be coupled to a processor bus 1412 that may transmit data signals between processor 1402 and other components in computer system 1400.

In at least one embodiment, processor 1402 may include, without limitation, a Level 1 ("L1") internal cache memory ("cache") 1404. In at least one embodiment, processor 1402 may have a single internal cache or multiple levels of internal cache. In at least one embodiment, the cache memory may reside external to processor 1402. Other embodiments may also include a combination of both internal and external caches depending on particular implementation and needs. In at least one embodiment, register file 1406 may store different types of data in various registers, including and without limitation, integer registers, floating-point registers, status registers, and instruction pointer registers.

In at least one embodiment, an execution unit 1408, including and without limitation, logic to perform integer and floating-point operations, also reside in processor 1402.

In at least one embodiment, processor 1402 may also include a microcode ("ucode") read-only memory ("ROM") that stores microcode for certain macro instructions. In at least one embodiment, execution unit 1408 may include logic to handle a packed instruction set 1410. In at least one embodiment, by including packed instruction set 1410 in an instruction set of a general-purpose processor 1402, along with associated circuitry to execute instructions, operations used by many multimedia applications may be performed using packed data in a general-purpose processor 1402. In one or more embodiments, many multimedia applications may be accelerated and executed more efficiently by using the full width of a processor's data bus for performing operations on packed data, which may eliminate the need to transfer smaller units of data across the processor's data bus to perform one or more operations one data element at a time.

In at least one embodiment, execution unit 1408 may also be used in microcontrollers, embedded processors, graphics devices, DSPs, and other types of logic circuits. In at least one embodiment, computer system 1400 may include, without limitation, a memory 1424. In at least one embodiment, memory 1424 may be implemented as a Dynamic Random Access Memory ("DRAM") device, a Static Random Access Memory ("SRAM") device, a flash memory device, or other memory devices. In at least one embodiment, memory 15124 may store instruction(s) 1422 and/or data 1426 represented by data signals that may be executed by processor 1402.

In at least one embodiment, the system logic chip may be coupled to processor bus 1412 and memory 1424. In at least one embodiment, the system logic chip may include, without limitation, a memory controller hub ("MCH") 1418, and processor 1402 may communicate with MCH 1418 via processor bus 1412. In at least one embodiment, MCH 1418 may provide a high bandwidth memory path 1420 to memory 1424 for instruction and data storage and for storage of graphics commands, data, and textures. In at least one embodiment, MCH 1418 may direct data signals between processor 1402, memory 1424, and other components in computer system 1400 and bridge data signals between processor bus 1412, memory 1424, and a system I/O 1428. In at least one embodiment, a system logic chip may provide a graphics port for coupling to a graphics controller. In at least one embodiment, MCH 1418 may be coupled to memory 1424 through a high bandwidth memory path 1420, and graphics/video card 1414 may be coupled to MCH 1418 through an Accelerated Graphics Port ("AGP") interconnect 1416.

In at least one embodiment, computer system 1400 may use system I/O 1428 that is a proprietary hub interface bus to couple MCH 1418 to I/O controller hub ("ICH") 1446. In at least one embodiment, ICH 1446 may provide direct connections to some I/O devices via a local I/O bus. In at least one embodiment, a local I/O bus may include, without limitation, a high-speed I/O bus for connecting peripherals to memory 1424, chipset, and processor 1402. Examples may include, without limitation, an audio controller 1444, a firmware hub ("flash BIOS") 1442, a wireless transceiver 1538, data storage 1434, a legacy I/O controller 1432 containing user input and user input interface 1436, a serial expansion port 1440, such as Universal Serial Bus ("USB"), and a network controller 1448. Data storage 1434 may comprise a hard disk drive, a floppy disk drive, a CD-ROM device, a flash memory device, or other mass storage devices.

In at least one embodiment, FIG. 14 illustrates a system 1400, which includes interconnected hardware devices or "chips," whereas, in other embodiments, FIG. 14 may illustrate an exemplary System on a Chip ("SoC"). In at least one embodiment, devices may be interconnected with proprietary interconnects, standardized interconnects (e.g., PCIe), or some combination thereof. In at least one embodiment, one or more components of computer system 1400 are interconnected using compute express link (CXL) interconnects.

Inference and/or training logic 1208 are used to perform inferencing and/or training operations associated with one or more embodiments. Details regarding inference and/or training logic 1208 are provided below in conjunction with FIG. 12A and/or FIG. 12B. In at least one embodiment, inference and/or training logic 1208 may be used in system FIG. 14 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve the performance of the network while limiting the amount of synthetic data to avoid overfitting.

Figure 15:
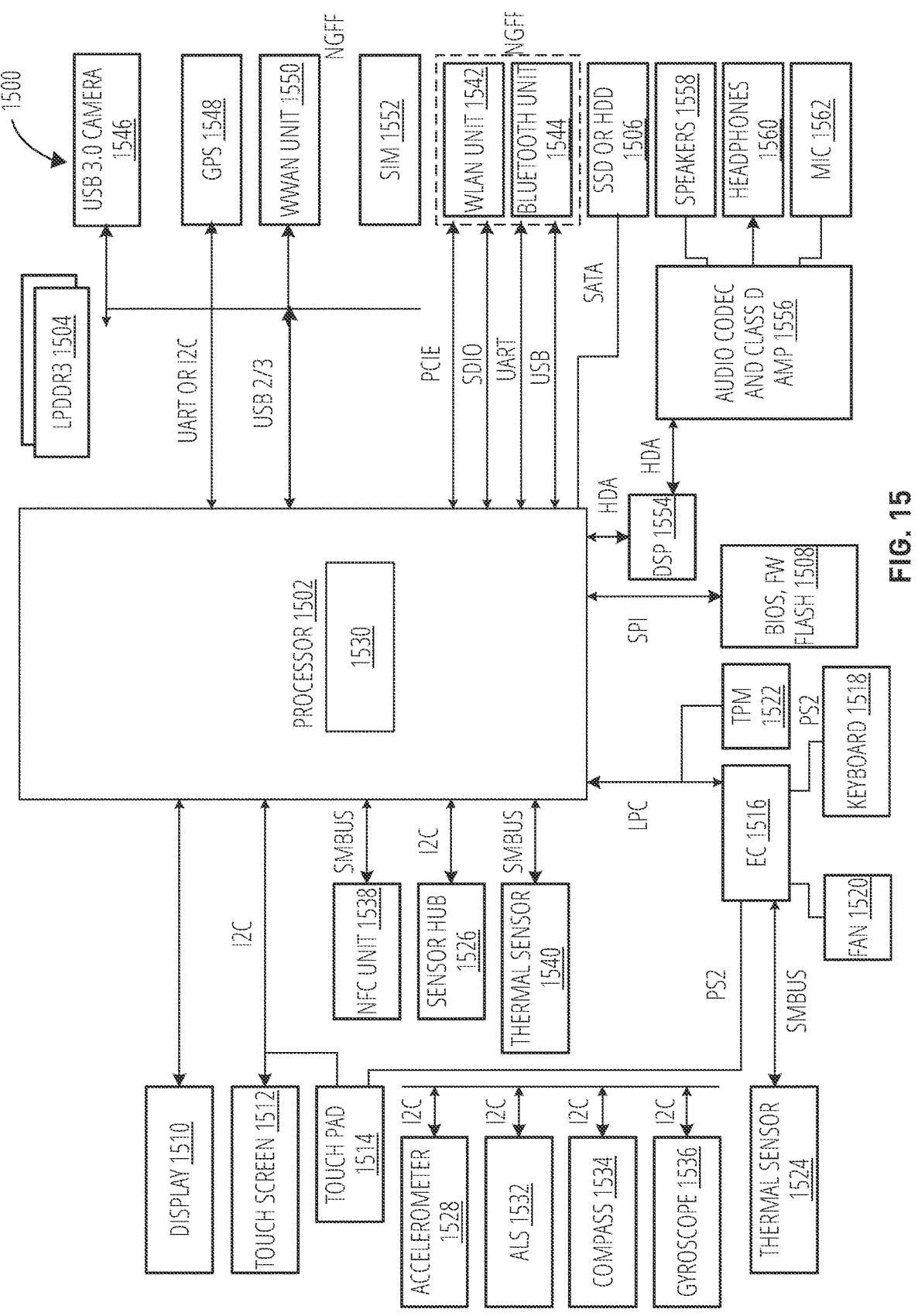
FIG. 15 illustrates a computer system, according to at least one embodiment.

FIG. 15 is a block diagram illustrating an electronic device 1500 for utilizing a processor 1502, according to at least one embodiment. In at least one embodiment, electronic device 1500 may be, for example, and without limitation, a notebook, a tower server, a rack server, a blade server, a laptop, a desktop, a tablet, a mobile device, a phone, an embedded computer, or any other suitable electronic device.

In at least one embodiment, system electronic device 1600 may include, without limitation, processor 1502 communicatively coupled to any suitable number or kind of components, peripherals, modules, or devices. In at least one embodiment, processor 1502 coupled using a bus or interface, such as an I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 15 illustrates a system, which includes interconnected hardware devices or "chips," whereas in other embodiments, FIG. 15 may illustrate an exemplary System on a Chip ("SoC"). In at least one embodiment, devices illustrated in FIG. 15 may be interconnected with proprietary interconnects, standardized interconnects (e.g., PCIe), or some combination thereof. In at least one embodiment, one or more components of FIG. 15 are interconnected using compute express link (CXL) interconnects.

In at least one embodiment, FIG. 15 may include a display 1510, a touch screen 1512, a touch pad 1514, a Near Field Communications unit ("NFC") 1538, a sensor hub 1526, a thermal sensor 1540, an Express Chipset ("EC") 1516, a Trusted Platform Module ("TPM") 1520, BIOS/firmware/flash memory ("BIOS, firmware (FW) Flash") 1508, a DSP 1554, a drive 1506 such as a Solid State Disk ("SSD") or a Hard Disk Drive ("HDD"), a wireless local area network unit ("WLAN") 1542, a Bluetooth unit 1544, a Wireless Wide Area Network unit ("WWAN") 1550, a Global Positioning System (GPS) 1548, a camera ("USB 3.0 camera") 1546, such as a USB 3.0 camera, and/or a Low Power Double Data Rate ("LPDDR") memory unit ("LPDDR3") 1504 implemented in, for example, LPDDR3 standard. These components may each be implemented in any suitable manner.

In at least one embodiment, other components may be communicatively coupled to processor 1502 through the components discussed above. In at least one embodiment, an accelerometer 1528, Ambient Light Sensor ("ALS") 1532, compass 1534, and a gyroscope 1536 may be communicatively coupled to sensor hub 1526. In at least one embodiment, thermal sensor 1540, a fan 1520, a keyboard 1518, and a touch pad 1514 may be communicatively coupled to Ec 1516. In at least one embodiment, speakers 1558, headphones 1560, and microphone ("mic") 1562 may be communicatively coupled to an audio unit ("audio codec and class d amp") 1556, which may, in turn, be communicatively coupled to DSP 1554. In at least one embodiment, audio unit 1556 may include, for example, and without limitation, an audio coder/decoder ("codec") and a class D amplifier. In at least one embodiment, SIM card ("SIM") 1552 may be communicatively coupled to WWAN unit 1550. In at least one embodiment, components such as WLAN unit 1542 and Bluetooth unit 1544, as well as WWAN unit 1550 may be implemented in a Next Generation Form Factor ("NGFF").

Inference and/or training logic 1208 are used to perform inferencing and/or training operations associated with one or more embodiments. Details regarding inference and/or training logic 1208 are provided below in conjunction with FIG. 12A and/or FIG. 12B. In at least one embodiment, inference and/or training logic 1208 may be used in system FIG. 15 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve the performance of the network while limiting the amount of synthetic data to avoid overfitting.

Figure 16:
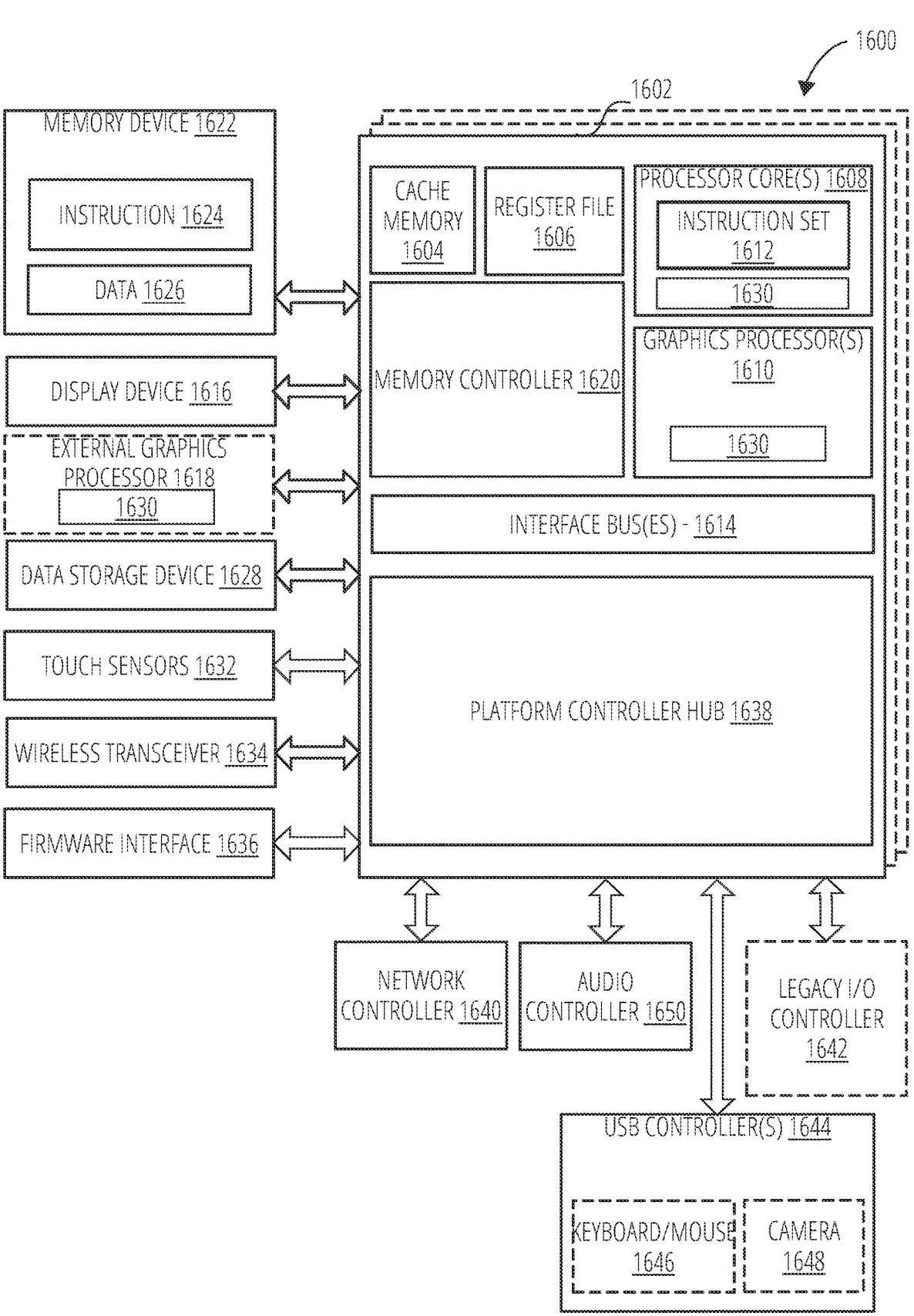
FIG. 16 illustrates at least portions of a graphics processor, according to one or more embodiments.

FIG. 16 is a block diagram of a processing system 1600, according to at least one embodiment. In at least one embodiment, the processing system 1600 includes one or more processor(s) 1602 and one or more graphics processor(s) 1610 and may be a single processor desktop system, a multiprocessor workstation system, or a server system having a large number of processor(s) 1602 or processor core(s) 1608. In at least one embodiment, the processing system 1600 is a processing platform incorporated within a system-on-a-chip (SoC) integrated circuit for use in mobile, handheld, or embedded devices.

In at least one embodiment, the processing system 1600 can include, or be incorporated within a server-based gaming platform, a game console, including a game and media console, a mobile gaming console, a handheld game console, or an online game console. In at least one embodiment, the processing system 1600 is a mobile phone, smart phone, tablet computing device, or mobile Internet device. In at least one embodiment, the processing system 1600 can also include, couple with, or be integrated within a wearable device, such as a smart watch wearable device, smart eyewear device, augmented reality device, or virtual reality device. In at least one embodiment, the processing system 1600 is a television or set-top box device having one or more processor(s) 1602 and a graphical interface generated by one or more graphics processor(s) 1610.

In at least one embodiment, one or more processor(s) 1602 each include one or more processor cores 1608 to process instructions which, when executed, perform operations for system and user software. In at least one embodiment, each of one or more processor core(s) 1608 is configured to process a specific instruction set 1709. In at least one embodiment, instruction set 1612 may facilitate Complex Instruction Set Computing (CISC), Reduced Instruction Set Computing (RISC), or computing via a Very Long Instruction Word (VLIW). In at least one embodiment, processor core(s) 1608 may each process a different instruction set 1612, which may include instructions to facilitate emulation of other instruction sets. In at least one embodiment, processor core(s) 1608 may also include other processing devices, such as a Digital Signal Processor (DSP).

In at least one embodiment, processor(s) 1602 includes cache memory 1604. In at least one embodiment, processor(s) 1608 can have a single internal cache or multiple levels of internal cache. In at least one embodiment, cache memory 1604 is shared among various components of processor(s) 1602. In at least one embodiment, processor(s) 1602 also uses an external cache (e.g., a Level-3 (L3) cache or Last Level Cache (LLC)) (not shown), which may be shared among processor core(s) 1608 using known cache coherency techniques. In at least one embodiment, register file 1606 is additionally included in processor(s) 1602, which may include different types of registers for storing different types of data (e.g., integer registers, floating-point registers, status registers, and an instruction pointer register). In at least one embodiment, register file 1606 may include general-purpose registers or other registers.

In at least one embodiment, one or more processor(s) 1602 are coupled with one or more interface bus(es) 1614 to transmit communication signals such as address, data, or control signals between processor core(s) 1608 and other components in processing system 1600. In at least one embodiment, interface bus(es) 1614, in one embodiment, can be a processor bus, such as a version of a Direct Media Interface (DMI) bus. In at least one embodiment, interface bus interface bus(es) 1614 is not limited to a DMI bus, and may include one or more Peripheral Component Interconnect buses (e.g., PCI, PCI Express), memory busses, or other types of interface busses. In at least one embodiment, processor(s) 1602 include an integrated memory controller 1620 and a platform controller hub 1638. In at least one embodiment, memory controller 1620 facilitates communication between a memory device and other components of the processing system 1600, while platform controller hub (PCH) 1638 provides connections to I/O devices via a local I/O bus.

In at least one embodiment, the memory device 1622 can be a dynamic random access memory (DRAM) device, a static random access memory (SRAM) device, a flash memory device, a phase-change memory device, or some other memory device having suitable performance to serve as process memory. In at least one embodiment, the memory device 1620 can operate as system memory for processing system 1600 to store data 1626 and instruction 1624 for use when one or more processor(s) 1602 executes an application or process. In at least one embodiment, memory controller 1620 also couples with an optional external graphics processor 1618, which may communicate with one or more graphics processor(s) 1610 in processor(s) 1602 to perform graphics and media operations. In at least one embodiment, a display device 1616 can connect to processor(s) 1602. In at least one embodiment, the display device 1616 can include one or more of an internal display device, as in a mobile electronic device or a laptop device, or an external display device attached via a display interface (e.g., DisplayPort, etc.). In at least one embodiment, display device 1616 can include a head-mounted display (HMD) such as a stereoscopic display device for use in virtual reality (VR) applications or augmented reality (AR) applications.

In at least one embodiment, the platform controller hub 1638 enables peripherals to connect to memory device 1622 and processor(s) 1602 via a high-speed I/O bus. In at least one embodiment, I/O peripherals include, but are not limited to, an audio controller 1650, a network controller 1640, a firmware interface 1636, a wireless transceiver 1634, touch sensors 1632, a data storage device 1628 (e.g., hard disk drive, flash memory, etc.). In at least one embodiment, the data storage device 1628 can connect via a storage interface (e.g., SATA) or via a peripheral bus, such as a Peripheral Component Interconnect bus (e.g., PCI, PCI Express). In at least one embodiment, touch sensors 1632 can include touch screen sensors, pressure sensors, or fingerprint sensors. In at least one embodiment, wireless transceiver 1634 can be a Wi-Fi transceiver, a Bluetooth transceiver, or a mobile network transceiver such as a 3G, 4G, or Long Term Evolution (LTE) transceiver. In at least one embodiment, firmware interface 1636 enables communication with system firmware and can be, for example, a unified extensible firmware interface (UEFI). In at least one embodiment, the network controller 1640 can enable a network connection to a wired network. In at least one embodiment, a high-performance network controller (not shown) couples with interface bus(es) 1614. In at least one embodiment, audio controller 1650 is a multi-channel high-definition audio controller. In at least one embodiment, the processing system 1600 includes an optional legacy I/O controller 1642 for coupling legacy (e.g., Personal System 2 (PS/2)) devices to the processing system 1600. In at least one embodiment, the platform controller hub 1638 can also connect to one or more Universal Serial Bus (USB) controllers 1644 connect input devices, such as keyboard and mouse 1646 combinations, a camera 1648, or other USB input devices.

In at least one embodiment, an instance of memory controller 1620 and platform controller hub 1638 may be integrated into a discreet external graphics processor, such as external graphics processor 1618. In at least one embodiment, the platform controller hub 1638 and/or memory controller 1620 may be external to one or more processor(s) 1602. For example, in at least one embodiment, the processing system 1600 can include an external memory controller 1620 and the platform controller hub 1638, which may be configured as a memory controller hub and peripheral controller hub within a system chipset that is in communication with the processor(s) 1602.

Inference and/or training logic 1208 are used to perform inferencing and/or training operations associated with one or more embodiments. Details regarding inference and/or training logic 1208 are provided below in conjunction with FIG. 12A and/or FIG. 12B. In at least one embodiment, inference and/or training logic 1208 may be used in system FIG. 16 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve the performance of the network while limiting the amount of synthetic data to avoid overfitting.

Figure 17:
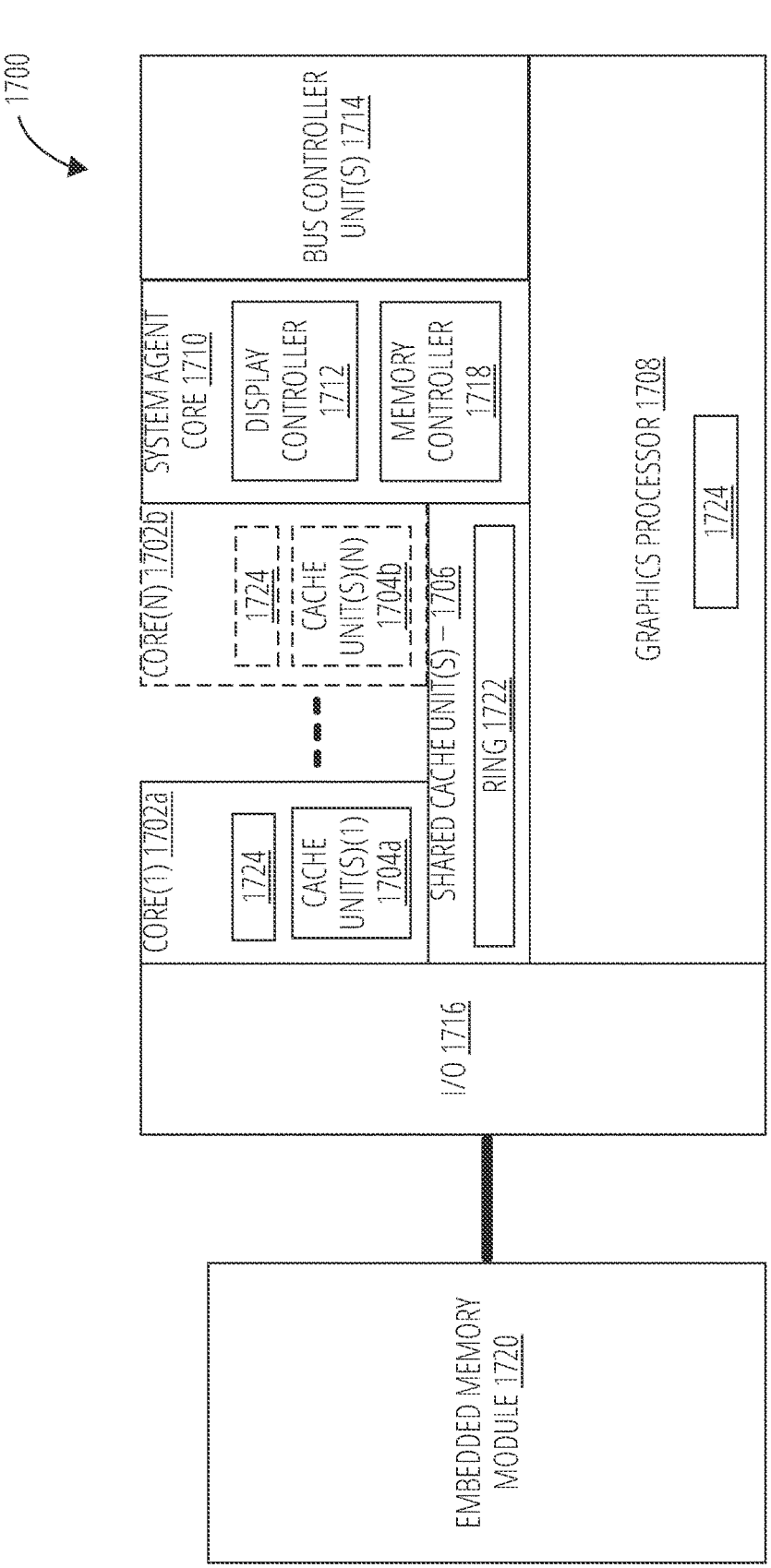
FIG. 17 illustrates at least portions of a graphics processor, according to one or more embodiments.

FIG. 17 is a block diagram of a processor 1700 having one or more processor core(1) 1702a-core(N) 1702b, an integrated memory controller 1718, and an integrated graphics processor 1708, according to at least one embodiment. In at least one embodiment, processor 1700 can include additional cores up to and including additional core(N) 1702b represented by dashed lined boxes. In at least one embodiment, each of processor core(1) 1702a0-core(N) 1702b includes one or more internal cache unit(s)(1) 1704*a*-cache unit(s)(N) 1704*b*. In at least one embodiment, each processor core also has access to one or more shared cached units 1706.

In at least one embodiment, internal cache unit(s)(1) 1704*a*-cache unit(s)(N) 1704*b* and shared cache units 1706 represent a cache memory hierarchy within processor 1700. In at least one embodiment, cache unit(s)(1) 1704*a*-cache unit(s)(N) 1704*b* may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1706 and cache unit(s)(1) 1704*a*-cache unit(s)(N) 1704*b*.

In at least one embodiment, processor 1700 may also include a set of one or more bus controller unit(s) 1714 and a system agent core 1710. In at least one embodiment, one or more bus controller unit(s) 1714 manage a set of peripheral buses, such as one or more PCI or PCI express busses. In at least one embodiment, system agent core 1710 provides management functionality for various processor components. In at least one embodiment, system agent core 1710 includes one or more integrated memory controller 1718 to manage access to various external memory devices (not shown).

In at least one embodiment, one or more of processor core(1) 1702*a*-core(N) 1702*b* include support for simultaneous multi-threading. In at least one embodiment, system agent core 1710 includes components for coordinating and operating processor core(1) 1702*a*-core(N) 1702*b* during multi-threaded processing. In at least one embodiment, system agent core 1710 may additionally include a power control unit (PCU), which includes logic and components to regulate one or more power states of processor core(1) 1702*a*-core(N) 1702*b* and graphics processor 1708.

In at least one embodiment, processor 1700 additionally includes graphics processor 1708 to execute graphics processing operations. In at least one embodiment, graphics processor 1708 couples with shared cache units 1706, and system agent core 1710, including one or more integrated memory controllers 1722. In at least one embodiment, system agent core 1710 also includes a display controller 1712 to drive graphics processor output to one or more coupled displays. In at least one embodiment, display controller 1712 may also be a separate module coupled with graphics processor 1708 via at least one interconnect, or may be integrated within graphics processor 1708.

In at least one embodiment, a ring-based interconnect unit 1722 is used to couple internal components of processor 1700. In at least one embodiment, an alternative interconnect unit may be used, such as a point-to-point interconnect, a switched interconnect, or other techniques. In at least one embodiment, graphics processor 1708 couples with ring-based interconnect unit 1722 via an I/O link 1716.

In at least one embodiment, I/O link 1716 represents at least one of multiple varieties of I/O interconnects, including an on-package I/O interconnect, which facilitates communication between various processor components and a high-performance embedded memory module 1720, such as an eDRAM module. In at least one embodiment, each of processor core(1) 1702*a*-core(N) 1702*b* and graphics processor 1708 use embedded memory module 1720 as a shared Last Level Cache.

In at least one embodiment, processor core(1) 1702*a*-core (N) 1702*b* are homogenous cores executing a common instruction set architecture. In at least one embodiment, processor core(1) 1702*a*-core(N) 1702*b* are heterogeneous in terms of instruction set architecture (ISA), where one or more of processor core(1) 1702*a*-core(N) 1702*b* execute a common instruction set, while one or more other cores of processor core(1) 1702*a*-core(N) 1702*b* executes a subset of a common instruction set or a different instruction set. In at least one embodiment, processor core(1) 1702*a*-core(N) 1702*b* are heterogeneous in terms of microarchitecture, where one or more cores have a relatively higher power consumption couple with one or more power cores having a lower power consumption. In at least one embodiment, processor 1700 can be implemented on one or more chips or as an SoC integrated circuit.

Inference and/or training logic 1208 are used to perform inferencing and/or training operations associated with one or more embodiments. Details regarding inference and/or training logic 1208 are provided below in conjunction with FIG. 12A and/or FIG. 12B. In at least one embodiment, inference and/or training logic 1208 may be used in system FIG. 17 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve the performance of the network while limiting the amount of synthetic data to avoid overfitting.

Virtualized Computing Platform

Figure 18:
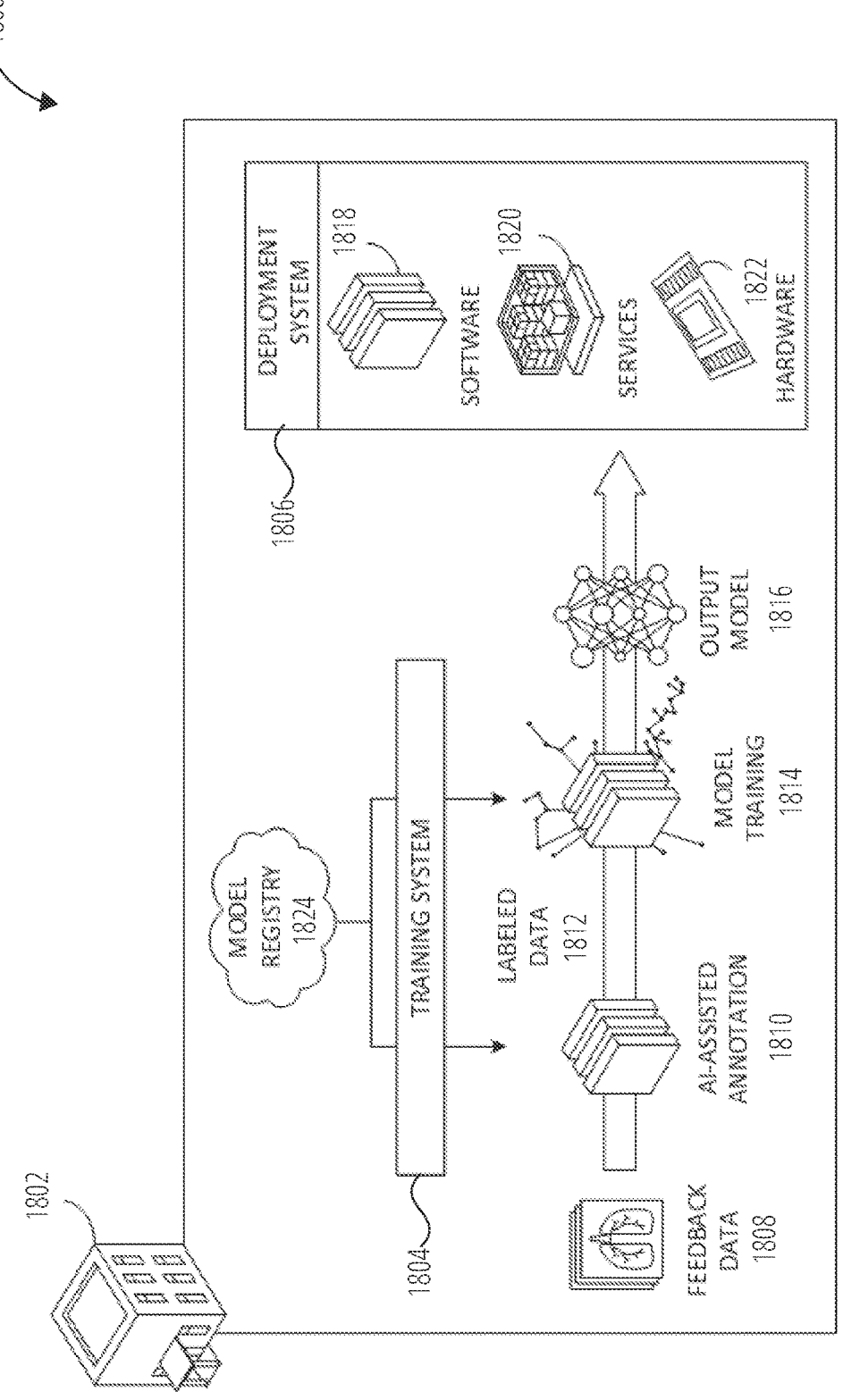
FIG. 18 is an example data flow diagram for an advanced computing pipeline, in accordance with at least one embodiment.

FIG. 18 is an example data flow diagram for a process 1800 of generating and deploying an image processing and inferencing pipeline, in accordance with at least one embodiment. In at least one embodiment, process 1800 may be deployed for use with predicting a number of idle cores (CPU core requirement) of computing devices, processing devices, and/or other device types at one or more facilities 1802 as idle or busy as described herein.

In at least one embodiment, process 1800 may be executed within a training system 1804 and/or a deployment system 1806. In at least one embodiment, the training system 1804 may be used to perform training, deployment, and embodiment of machine learning models (e.g., neural networks, object detection algorithms, computer vision algorithms, etc.) for use in deployment system 1806. In at least one embodiment, deployment system 1806 may be configured to offload processing and compute resources among a distributed computing environment to reduce infrastructure requirements at facility 1802. In at least one embodiment, deployment system 1806 may provide a streamlined platform for selecting, customizing, and implementing virtual instruments for use with computing devices at facility 1802. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 1806 during the execution of applications.

In at least one embodiment, some of the applications used in advanced processing and inferencing pipelines may use machine learning models or other artificial intelligence (AI) to perform one or more processing steps. In at least one embodiment, machine learning models may be trained at facility 1802 using feedback data 1808 stored at facility 1802 or feedback data 1808 from another facility or facilities, or a combination thereof. In at least one embodiment, the training system 1804 may be used to provide applications, services, and/or other resources for generating working, deployable machine learning models for deployment system 1806.

In at least one embodiment, a model registry 1824 may be backed by object storage that may support versioning and object metadata. In at least one embodiment, object storage may be accessible through, for example, a cloud storage (e.g., a cloud 1928 of FIG. 19) compatible application programming interface (API) from within a cloud platform. In at least one embodiment, machine learning models within model registry 1824 may be uploaded, listed, modified, or deleted by developers or partners of a system interacting with an API. In at least one embodiment, an API may provide access to methods that allow users with appropriate credentials to associate models with applications, such that models may be executed as part of the execution of containerized instantiations of applications.

In at least one embodiment, a training pipeline 1904 (FIG. 19) may include a scenario where facility 1802 is training their own machine learning model, or has an existing machine learning model that needs to be optimized or updated. In at least one embodiment, feedback data 1808 may be received from various channels, such as forums, web forms, or the like. In at least one embodiment, once feedback data 1808 is received, AI-assisted annotation 1810 may be used to aid in generating annotations corresponding to feedback data 1808 to be used as ground truth data for a machine learning model. In at least one embodiment, AI-assisted annotation 1810 may include one or more machine learning models (e.g., convolutional neural networks (CNNs)) that may be trained to generate annotations corresponding to certain types of feedback data 1808 (e.g., from certain devices) and/or certain types of anomalies in feedback data 1808. In at least one embodiment, AI-assisted annotations 1810 may then be used directly, or may be adjusted or fine-tuned using an annotation tool to generate ground truth data. In at least one embodiment, in some examples, labeled data 1812 may be used as ground truth data for training a machine learning model. In at least one embodiment, AI-assisted annotations 1810, labeled data 1812, or a combination thereof may be used as ground truth data for training a machine learning model, e.g., via model training 1814 in FIG. 18 to FIG. 19. In at least one embodiment, a trained machine learning model may be referred to as an output model 1816, and may be used by deployment system 1806, as described herein.

In at least one embodiment, training pipeline 1904 (FIG. 19) may include a scenario where facility 1802 needs a machine learning model for use in performing one or more processing tasks for one or more applications in deployment system 1806, but facility 1802 may not currently have such a machine learning model (or may not have a model that is optimized, efficient, or effective for such purposes). In at least one embodiment, an existing machine learning model may be selected from model registry 1824. In at least one embodiment, model registry 1824 may include machine learning models trained to perform a variety of different inference tasks on imaging data. In at least one embodiment, machine learning models in model registry 1824 may have been trained on imaging data from different facilities than facility 1802 (e.g., facilities that are remotely located). In at least one embodiment, machine learning models may have been trained on imaging data from one location, two locations, or any number of locations. In at least one embodiment, when being trained on imaging data, which may be a form of feedback data, from a specific location, training may take place at that location, or at least in a manner that protects the confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 1824. In at least one embodiment, a machine learning model may then be retrained, or updated, at any number of other facilities, and a retrained or updated model may be made available in model registry 1824. In at least one embodiment, a machine learning model may then be selected from model registry 1824—and referred to as output model 1816—and may be used in deployment system 1806 to perform one or more processing tasks for one or more applications of a deployment system.

In at least one embodiment, training pipeline 1904 (FIG. 19) may be used in a scenario that includes facility 1802 requiring a machine learning model for use in performing one or more processing tasks for one or more applications in deployment system 1806, but facility 1802 may not currently have such a machine learning model (or may not have a model that is optimized, efficient, or effective for such purposes). In at least one embodiment, a machine learning model selected from model registry 1824 might not be fine-tuned or optimized for feedback data 1808 generated at facility 1802 because of differences in populations, genetic variations, the robustness of training data used to train a machine learning model, diversity in anomalies of training data, and/or other issues with training data. In at least one embodiment, AI-assisted annotation 1810 may be used to aid in generating annotations corresponding to feedback data 1808 to be used as ground truth data for retraining or updating a machine learning model. In at least one embodiment, labeled data 1812 may be used as ground truth data for training a machine learning model. In at least one embodiment, retraining or updating a machine learning model may be referred to as model training 1814. In at least one embodiment, model training 1814—e.g., AI-assisted annotations 1810, labeled data 1812, or a combination thereof—may be used as ground truth data for retraining or updating a machine learning model.

In at least one embodiment, deployment system 1806 may include software 1818, services 1820, hardware 1822, and/or other components, features, and functionality. In at least one embodiment, deployment system 1806 may include a software "stack," such that software 1818 may be built on top of services 1820 and may use services 1820 to perform some or all of processing tasks, and services 1820 and software 1818 may be built on top of hardware 1822 and use hardware 1822 to execute processing, storage, and/or other compute tasks of deployment system 1806.

In at least one embodiment, software 1818 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device, there may be any number of containers that may perform a data processing task with respect to feedback data 1808 (or other data types, such as those described herein). In at least one embodiment, an advanced processing and inferencing pipeline may be defined based on selections of different containers that are desired or required for processing feedback data 1808, in addition to containers that receive and configure imaging data for use by each container and/or for use by facility 1802 after processing through a pipeline (e.g., to convert outputs back to a usable data type for storage and display at facility 1802). In at least one embodiment, a combination of containers within software 1818 (e.g., that make up a pipeline) may be referred to as a virtual instrument (as described in more detail herein), and a virtual instrument may leverage services 1820 and hardware 1822 to execute some or all processing tasks of applications instantiated in containers.

In at least one embodiment, data may undergo preprocessing as part of the data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1816 of training system 1804.

In at least one embodiment, tasks of the data processing pipeline may be encapsulated in one or more container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1824 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK that may support at least some of services 1820 as a system (e.g., system 1900 of FIG. 19). In at least one embodiment, once validated by system 1900 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 19:
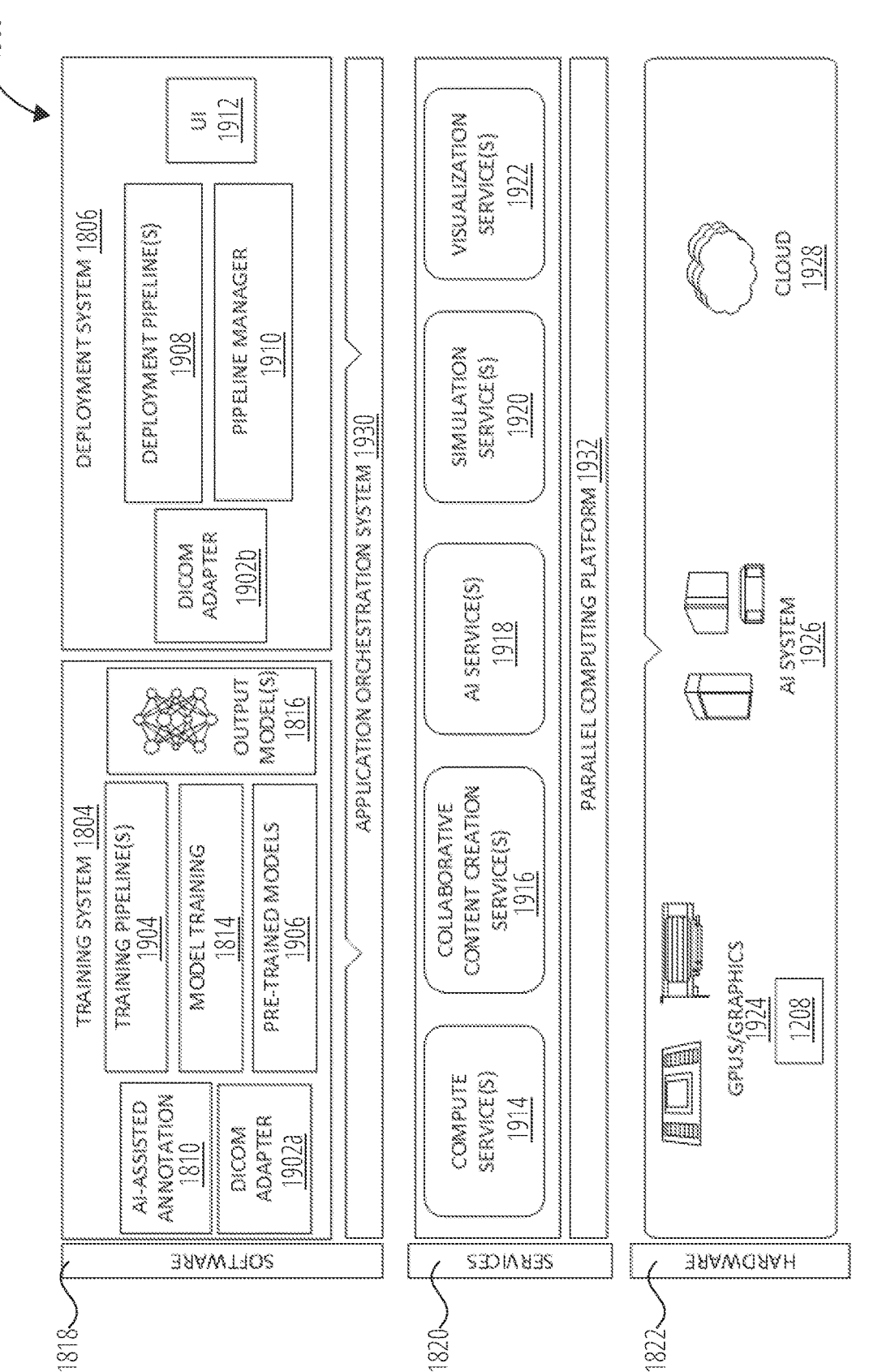
FIG. 19 is a system diagram for an example system for training, adapting, instantiating, and deploying machine learning models in an advanced computing pipeline, in accordance with at least one embodiment.

In at least one embodiment, developers may then share applications or containers through a network for access and use by users of a system (e.g., system 1900 of FIG. 19). In at least one embodiment, completed and validated applications or containers may be stored in a container registry, and associated machine learning models may be stored in model registry 1824. In at least one embodiment, a requesting entity that provides an inference or image processing request may browse a container registry and/or model registry 1824 for an application, container, dataset, machine learning model, etc., select a desired combination of elements for inclusion in the data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 1806 (e.g., a cloud) to perform processing of a data processing pipeline. In at least one embodiment, processing by deployment system 1806 may include referencing selected elements (e.g., applications, containers, models, etc.) from a container registry and/or model registry 1824. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1820 may be leveraged. In at least one embodiment, services 1820 may include compute services, collaborative content creation services, simulation services, AI services, visualization services, and/or other service types. In at least one embodiment, services 1820 may provide functionality that is common to one or more applications in software 1818, so functionality may be abstracted to a service that may be called upon or leveraged by applications. In at least one embodiment, the functionality provided by services 1820 may run dynamically and more efficiently, while also scaling well by allowing applications to process data in parallel, e.g., using a parallel computing platform 1930 (FIG. 19). In at least one embodiment, rather than each application that shares a same functionality offered by a service 1820 being required to have a respective instance of service 1820, service 1820 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 1820 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1818 implementing advanced processing and inferencing pipeline may be streamlined because each application may call upon a same inference service to perform one or more inferencing tasks.

In at least one embodiment, hardware 1822 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 1822 may be used to provide efficient, purpose-built support for software 1818 and services 1820 in deployment system 1806. In at least one embodiment, the use of GPU processing may be implemented for processing locally (e.g., at facility 1802), within an AI/deep learning system, in a cloud system, and/or in other processing components of deployment system 1806 to improve efficiency, accuracy, and efficacy of game name recognition.

In at least one embodiment, software 1818 and/or services 1820 may be optimized for GPU processing with respect to deep learning, machine learning, and/or high-performance computing, simulation, and visual computing, as non-limiting examples. In at least one embodiment, at least some of the computing environment of deployment system 1806 and/or training system 1804 may be executed in a data center or one or more supercomputers or high-performance computing systems, with GPU-optimized software (e.g., hardware and software combination of NVIDIA's DGX™ system). In at least one embodiment, hardware 1822 may include any number of GPUs that may be called upon to perform processing of data in parallel, as described herein. In at least one embodiment, the cloud platform may further include GPU processing for GPU-optimized execution of deep learning tasks, machine learning tasks, or other computing tasks. In at least one embodiment, a cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, a cloud platform may integrate an application container clustering system or orchestration system (e.g., KUBERNETES) on multiple GPUs to enable seamless scaling and load balancing.

FIG. 19 is a system diagram for an example system 1900 for generating and deploying a deployment pipeline, according to at least one embodiment. In at least one embodiment, system 1900 may be used to implement process 1800 of FIG. 18 and/or other processes, including advanced processing and inferencing pipelines. In at least one embodiment, system 1900 may include training system 1804 and deployment system 1806. In at least one embodiment, training system 1804 and deployment system 1806 may be implemented using software 1918, services 1920, and/or hardware 1822, as described herein.

In at least one embodiment, system 1900 (e.g., training system 1804 and/or deployment system 1806) may be implemented in a cloud computing environment (e.g., using cloud 1928). In at least one embodiment, system 1900 may be implemented locally with respect to a facility, or as a combination of both cloud and local computing resources. In at least one embodiment, access to APIs in cloud 1928 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1900, may be restricted to a set of public internet service providers (ISPs) that have been vetted or authorized for interaction.

In at least one embodiment, various components of system 1900 may communicate between and among one another using any of a variety of different network types, including but not limited to local area networks (LANs) and/or wide area networks (WANs) via wired and/or wireless communication protocols. In at least one embodiment, communication between facilities and components of system 1900 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, the training system 1804 may execute training pipelines 1904, similar to those described herein with respect to FIG. 18. In at least one embodiment, where one or more machine learning models are to be used in deployment pipelines 1908 by deployment system 1806, training pipelines 1904 may be used to train or retrain one or more (e.g., pre-trained) models, and/or implement one or more of pre-trained models 1906 (e.g., without a need for retraining or updating). In at least one embodiment, as a result of training pipelines 1904, output model(s) 1916 may be generated. In at least one embodiment, training pipelines 1904 may include any number of processing steps, AI-assisted annotation 1910, labeling or annotating of feedback data 1908 to generate labeled data 1912, the model selection from a model registry, model training 1914, training, retraining, or updating models, and/or other processing steps. In at least one embodiment, for different machine learning models used by deployment system 1806, different training pipelines 1904 may be used. In at least one embodiment, training pipeline 1904, similar to a first example described with respect to FIG. 18, may be used for a first machine learning model, training pipeline 1904, similar to a second example described with respect to FIG. 18, may be used for a second machine learning model, and training pipeline 1904, similar to a third example described with respect to FIG. 18, may be used for a third machine learning model. In at least one embodiment, any combination of tasks within training system 1804 may be used depending on what is required for each respective machine learning model. In at least one embodiment, one or more of machine learning models may already be trained and ready for deployment, so machine learning models may not undergo any processing by training system 1804, and may be implemented by deployment system 1806.

In at least one embodiment, output model(s) 1816 and/or pre-trained model(s) 1906 may include any type of machine learning models depending on the embodiment. In at least one embodiment, and without limitation, machine learning models used by system 1900 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1904 may include AI-assisted annotation. In at least one embodiment, labeled data 1812 (e.g., traditional annotation) may be generated by any number of techniques. In at least one embodiment, labels or other annotations may be generated within a drawing program (e.g., an annotation program), a computer-aided design (CAD) program, a labeling program, or another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human-annotated (e.g., labeler, or annotation expert, defines the location of labels), and/or a combination thereof. In at least one embodiment, for each instance of feedback data 1808 (or other data type used by machine learning models), there may be corresponding ground truth data generated by training system 1804. In at least one embodiment, AI-assisted annotation may be performed as part of deployment pipelines 1908; either in addition to, or in lieu of, AI-assisted annotation included in training pipelines 1904. In at least one embodiment, system 1900 may include a multi-layer platform that may include a software layer (e.g., software 1818) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 1802. In at least one embodiment, applications may then call or execute one or more services 1820 for performing compute, AI, or visualization tasks associated with respective applications, and software 1818 and/or services 1820 may leverage hardware 1822 to perform processing tasks in an effective and efficient manner.

In at least one embodiment, deployment system 1806 may execute deployment pipelines 1908. In at least one embodiment, deployment pipelines 1908 may include any number of applications that may be sequentially, non-sequentially, or otherwise applied to feedback data (and/or other data types), including AI-assisted annotation, as described above. In at least one embodiment, as described herein, a deployment pipeline 1910 for an individual device may be referred to as a virtual instrument for a device. In at least one embodiment, for a single device, there may be more than one deployment pipeline 1910, depending on the information desired from data generated by a device.

In at least one embodiment, applications available for deployment pipelines 1908 may include any application that may be used for performing processing tasks on feedback data or other data from devices. In at least one embodiment, because various applications may share common image operations, in some embodiments, a data augmentation library (e.g., as one of services 1820) may be used to accelerate these operations. In at least one embodiment, to avoid bottlenecks of conventional processing approaches that rely on CPU processing, parallel computing platform 1930 may be used for GPU acceleration of these processing tasks.

In at least one embodiment, deployment system 1806 may include a user interface 1914 (e.g., a graphical user interface, a web interface, etc.) that may be used to select applications for inclusion in deployment pipeline(s) 1908, arrange applications, modify or change applications or parameters or constructs thereof, use and interact with deployment pipeline(s) 1908 during set-up and/or deployment, and/or to otherwise interact with deployment system 1806. In at least one embodiment, although not illustrated with respect to training system 1804, user interface 1912 (or a different user interface) may be used for selecting models for use in deployment system 1806, for selecting models for training, or retraining, in training system 1804, and/or for otherwise interacting with training system 1804.

In at least one embodiment, pipeline manager 1910 may be used, in addition to an application orchestration system 1930, to manage the interaction between applications or containers of deployment pipeline(s) 1908 and services 1820 and/or hardware 1822. In at least one embodiment, pipeline manager 1910 may be configured to facilitate interactions from application to application, from application to service 1820, and/or from application or service to hardware 1822. In at least one embodiment, although illustrated as included in software 1818, this is not intended to be limiting, and in some examples pipeline manager 1910 may be included in services 1820. In at least one embodiment, the application orchestration system 1930 (e.g., Kubernetes, DOCKER, etc.) may include a container orchestration system that may group applications into containers as logical units for coordination, management, scaling, and deployment. In at least one embodiment, by associating applications from deployment pipeline(s) 1910 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication and cooperation between different containers or applications may be aided by pipeline manager 1910 and application orchestration system 1930. In at least one embodiment, so long as an expected input and/or output of each container or application is known by a system (e.g., based on constructs of applications or containers), application orchestration system 1930 and/or pipeline manager 1910 may facilitate communication among and between, and sharing of resources among and between, each of applications or containers. In at least one embodiment, because one or more of applications or containers in deployment pipeline(s) 1910 may share the same services and resources, application orchestration system 1930 may orchestrate, load balance, and determine to share of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of the requirements and availability of a system. In some examples, the scheduler (and/or other components of application orchestration system 1930) may determine resource availability and distribution based on constraints imposed on a system (e.g., user constraints), such as quality of service (QoS), the urgency of the need for data outputs (e.g., to determine whether to execute real-time processing or delayed processing), etc.

In at least one embodiment, services 1820 leveraged and shared by applications or containers in deployment system 1806 may include compute services 1916, collaborative content creation services 1917, AI services 1918, simulation services 1913, visualization services 1920, and/or other service types. In at least one embodiment, applications may call (e.g., execute) one or more of services 1820 to perform processing operations for an application. In at least one embodiment, compute services 1916 may be leveraged by applications to perform super-computing or other high-performance computing (HPC) tasks. In at least one embodiment, compute service(s) 1916 may be leveraged to perform parallel processing (e.g., using a parallel computing platform 1930) for processing data through one or more of applications and/or one or more tasks of a single application, substantially simultaneously. In at least one embodiment, parallel computing platform 1930 (e.g., NVIDIA's CUDA®) may enable general-purpose computing on GPUs (e.g., GPUs 1924). In at least one embodiment, a software layer of parallel computing platform 1930 may provide access to virtual instruction sets and parallel computational elements of GPUs for the execution of compute kernels. In at least one embodiment, parallel computing platform 1930 may include memory, and, in some embodiments, a memory may be shared between and among multiple containers, and/or between and among different processing tasks within a single container. In at least one embodiment, inter-process communication (IPC) calls may be generated for multiple containers and/or for multiple processes within a container to use the same data from a shared segment of the memory of a parallel computing platform 1930 (e.g., where multiple different stages of an application or multiple applications are processing same information). In at least one embodiment, rather than making a copy of data and moving data to different locations in memory (e.g., a read/write operation), the same data in the same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, the location of data and a location of updated or modified data may be part of a definition of how a payload is understood within containers.

In at least one embodiment, AI services 1918 may be leveraged to perform inferencing services for executing machine learning model(s) associated with applications (e.g., tasked with performing one or more processing tasks of an application). In at least one embodiment, AI services 1918 may leverage AI system 1926 to execute machine learning model(s) (e.g., neural networks, such as CNNs) for segmentation, reconstruction, object detection, feature detection, classification, and/or other inferencing tasks. In at least one embodiment, applications of deployment pipeline(s) 1908 may use one or more of output models 1816 from training system 1804 and/or other models of applications to perform inference on imaging data (e.g., DICOM data, RIS data, CIS data, REST compliant data, RPC data, raw data, etc.). In at least one embodiment, two or more examples of inferencing using application orchestration system 1930 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, the application orchestration system 1930 may distribute resources (e.g., services 1820 and/or hardware 1822) based on priority paths for different inferencing tasks of AI services 1918.

In at least one embodiment, shared storage may be mounted to AI services 1918 within system 1900. In at least one embodiment, shared storage may operate as a cache (or other storage device type) and may be used to process inference requests from applications. In at least one embodiment, when an inference request is submitted, a request may be received by a set of API instances of deployment system 1806, and one or more instances may be selected (e.g., for best fit, for load balancing, etc.) to process a request. In at least one embodiment, to process a request, a request may be entered into a database, a machine learning model may be located from model registry 1824 if not already in a cache, a validation step may ensure the appropriate machine learning model is loaded into a cache (e.g., shared storage), and/or a copy of a model may be saved to a cache. In at least one embodiment, the scheduler (e.g., of pipeline manager 1910) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally, a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, the transfer of requests between services 1820 and inference applications may be hidden behind a software development kit (SDK), and robust transport may be provided through a queue. In at least one embodiment, a request is placed in a queue via an API for an individual application/tenant ID combination, and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1928, and an inference service may perform inferencing on a GPU.

In at least one embodiment, visualization services 1920 may be leveraged to generate visualizations for viewing outputs of applications and/or deployment pipeline(s) 1910. In at least one embodiment, GPUs 1924 may be leveraged by visualization services 1920 to generate visualizations. In at least one embodiment, rendering effects, such as ray-tracing or other light transport simulation techniques, may be implemented by visualization services 1920 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1920 may include an internal visualizer, cinematics, and/or other rendering or image processing capabilities or functionality (e.g., ray tracing, rasterization, internal optics, etc.).

In at least one embodiment, hardware 1822 may include GPUs 1924, AI system 1926, cloud 1928, and/or any other hardware used for executing training system 1804 and/or deployment system 1806. In at least one embodiment, GPUs 1924 (e.g., NVIDIA's TESLA® and/or QUADRO® GPUs) may include any number of GPUs that may be used for executing processing tasks of compute services 1914, collaborative content creation services 1916, AI services 1918, simulation services 1920, visualization services 1922, other services, and/or any of features or functionality of software 1818. For example, with respect to AI services 1918, GPUs 1924 may be used to perform pre-processing on imaging data (or other data types used by machine learning models), post-processing on outputs of machine learning models, and/or to perform inferencing (e.g., to execute machine learning models). In at least one embodiment, cloud 1928, AI system 1926, and/or other components of system 1900 may use GPUs 1924. In at least one embodiment, cloud 1928 may include a GPU-optimized platform for deep learning tasks. In at least one embodiment, AI system 1926 may use GPUs 1924, and cloud 1928—or at least a portion tasked with deep learning or inferencing—may be executed using one or more AI systems 1926. As such, although hardware 1822 is illustrated as discrete components, this is not intended to be limiting, and any components of hardware 1822 may be combined with, or leveraged by, any other components of hardware 1822.

In at least one embodiment, AI system 1926 may include a purpose-built computing system (e.g., a super-computer or an HPC) configured for inferencing, deep learning, machine learning, and/or other artificial intelligence tasks. In at least one embodiment, AI system 1926 (e.g., NVIDIA's DGX™) may include GPU-optimized software (e.g., a software stack) that may be executed using a plurality of GPUs 1924, in addition to CPUs, RAM, storage, and/or other components, features, or functionality. In at least one embodiment, one or more AI systems 1924 may be implemented in cloud 1928 (e.g., in a data center) for performing some or all of the AI-based processing tasks of system 1900.

In at least one embodiment, cloud 1928 may include a GPU-accelerated infrastructure (e.g., NVIDIA's NGC™) that may provide a GPU-optimized platform for executing processing tasks of system 1900. In at least one embodiment, cloud 1928 may include an AI system(s) 1926 for performing one or more of the AI-based tasks of system 1900 (e.g., as a hardware abstraction and scaling platform). In at least one embodiment, cloud 1928 may integrate with application orchestration system 1930, leveraging multiple GPUs to enable seamless scaling and load balancing between and among applications and services 1820. In at least one embodiment, cloud 1928 may be tasked with executing at least some of services 1820 of system 1900, including compute services 1914, AI services 1918, and/or visualization services 1922, as described herein. In at least one embodiment, cloud 1928 may perform small and large batch inference (e.g., executing NVIDIA's TensorRT™), provide an accelerated parallel computing API and platform 1930 (e.g., NVIDIA's CUDA®), execute application orchestration system 1930 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1900.

In at least one embodiment, in an effort to preserve patient confidentiality (e.g., where patient data or records are to be used off-premises), cloud 1928 may include a registry, such as a deep learning container registry. In at least one embodiment, a registry may store containers for instantiations of applications that may perform pre-processing, post-processing, or other processing tasks on patient data. In at least one embodiment, cloud 1928 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, the confidentiality of patient data is preserved in compliance with HIPAA and/or other data regulations.

Figure 20A:
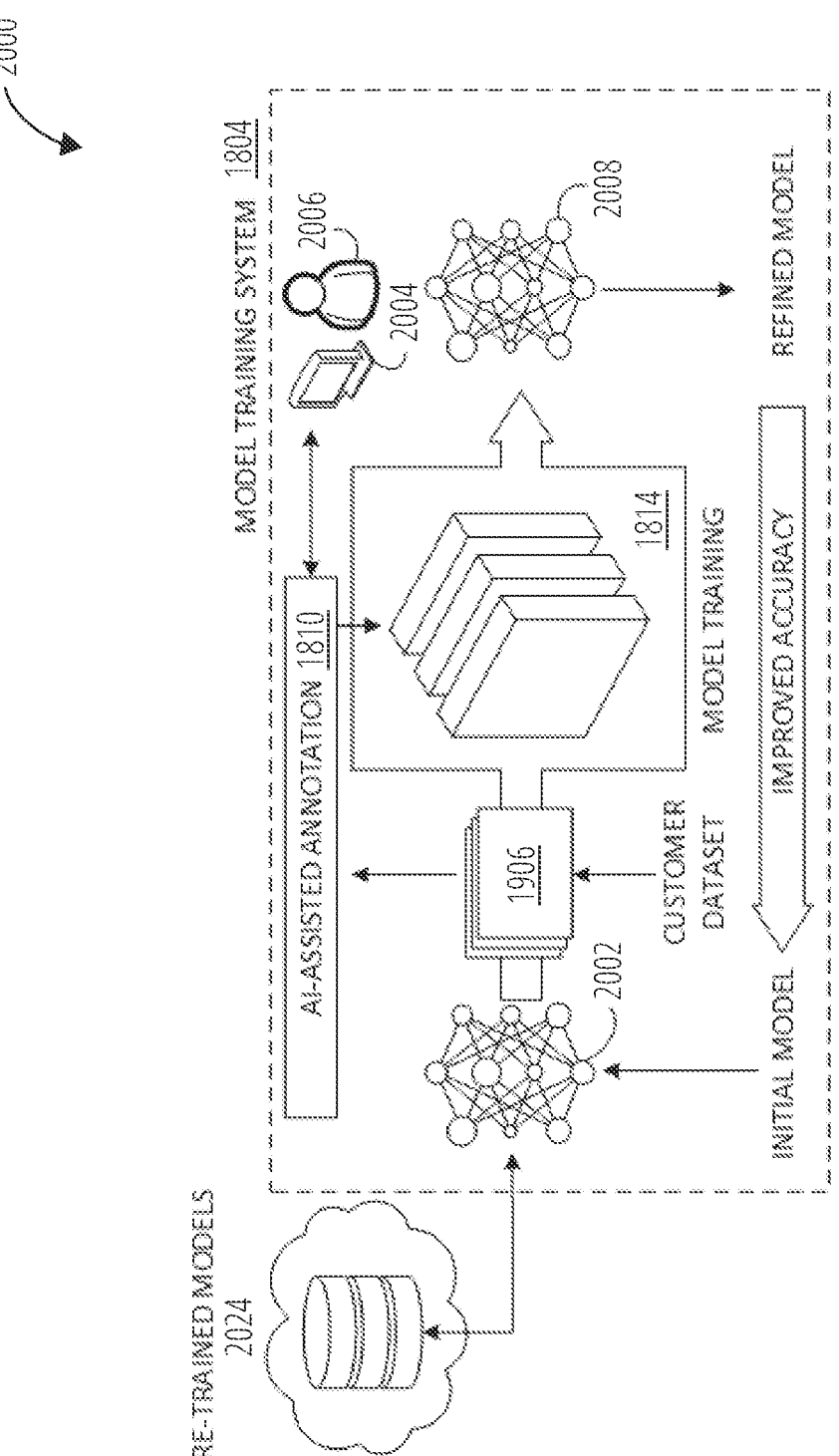
FIG. 20A and FIG. 20B illustrate a data flow diagram for a process to train a machine learning model, as well as client-server architecture to enhance annotation tools with pre-trained annotation models, in accordance with at least one embodiment.

FIG. 20A illustrates a data flow diagram for a process 2000 to train, retrain, or update a machine learning model, in accordance with at least one embodiment. In at least one embodiment, process 2000 may be executed using, as a non-limiting example, system 1900 of FIG. 19. In at least one embodiment, process 2000 may leverage services 1820 and/or hardware 1822 of system 1900, as described herein. In at least one embodiment, refined models 2008 generated by process 2000 may be executed by deployment system 1806 for one or more containerized applications in deployment pipelines 1908.

In at least one embodiment, model training 1814 may include retraining or updating an initial model 2002 (e.g., a pre-trained model) using new training data (e.g., new input data, such as customer dataset 1906, and/or new ground truth data associated with input data). In at least one embodiment, to retrain, or update, the initial model 2002, the output or loss layer(s) of the initial model 2002 may be reset, or deleted, and/or replaced with an updated or new output or loss layer(s). In at least one embodiment, the initial model 2002 may have previously fine-tuned parameters (e.g., weights and/or biases) that remain from prior training, so model training 1814 or retraining may not take as long or require as much processing as training a model from scratch. In at least one embodiment, during model training 1814, by having reset or replaced output or loss layer(s) of the initial model 2002, parameters may be updated and re-tuned for a new data set based on loss calculations associated with the accuracy of output or loss layer(s) at generating predictions on new, customer dataset 1906 (e.g., feedback data 1808 of FIG. 18).

In at least one embodiment, pre-trained models 2024 may be stored in a data store or registry (e.g., model registry 1824 of FIG. 18). In at least one embodiment, pre-trained models 2024 may have been trained, at least in part, at one or more facilities other than a facility executing process 2000. In at least one embodiment, to protect the privacy and rights of patients, subjects, or clients of different facilities, pre-trained models 2024 may have been trained on-premises, using customer or patient data generated on-premises. In at least one embodiment, pre-trained models 2024 may be trained using cloud 1426 and/or other hardware 1822, but confidential, privacy-protected patient data may not be transferred to, used by, or accessible to any components of cloud 1426 (or other off-premises hardware). In at least one embodiment, where a pre-trained model 2024 is trained using patient data from more than one facility, the pre-trained model 2024 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premises, such as in a data center or other cloud computing infrastructure.

In at least one embodiment, when selecting applications for use in deployment pipelines 1908, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1906 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 2024 that is to be updated, retrained, and/or fine-tuned, and pre-trained model 2024 may be referred to as initial model 2024 for training system 1804 within process 2000. In at least one embodiment, customer dataset 1806 (e.g., imaging data, genomics data, sequencing data, or other data types generated by devices at a facility) may be used to perform model training 1814 (which may include, without limitation, transfer learning) on initial model 2024 to generate refined model 2008. In at least one embodiment, ground truth data corresponding to customer dataset 1906 may be generated by training system 1804. In at least one embodiment, ground truth data may be generated, at least in part, by clinicians, scientists, doctors, and practitioners, at a facility 1802.

In at least one embodiment, AI-assisted annotation 1810 may be used in some examples to generate ground truth data. In at least one embodiment, AI-assisted annotation 1810 (e.g., implemented using an AI-assisted annotation SDK) may leverage machine learning models (e.g., neural networks) to generate suggested or predicted ground truth data for a customer dataset. In at least one embodiment, user 2006 may use annotation tools within a user interface (a graphical user interface (GUI)) on a computing device 2004.

In at least one embodiment, user 2006 may interact with a GUI via a computing device to edit or fine-tune (auto) annotations. In at least one embodiment, a polygon editing feature may be used to move vertices of a polygon to more accurate or fine-tuned locations.

In at least one embodiment, once customer dataset 1906 has associated ground truth data, ground truth data (e.g., from AI-assisted annotation, manual labeling, etc.) may be used by during model training 1814 to generate refined model 2008. In at least one embodiment, customer dataset 1906 may be applied to initial model 2024 any number of times, and ground truth data may be used to update parameters of initial model 2024 until an acceptable level of accuracy is attained for refined model 2008. In at least one embodiment, once refined model 2008 is generated, refined model 2008 may be deployed within one or more deployment pipelines 1908 at a facility for performing one or more processing tasks with respect to medical imaging data.

In at least one embodiment, refined model 2008 may be uploaded to pre-trained models 2024 in model registry 1824 to be selected by another facility. In at least one embodiment, his process may be completed at any number of facilities such that refined model 2008 may be further refined on new datasets any number of times to generate a more universal model.

Figure 20B:
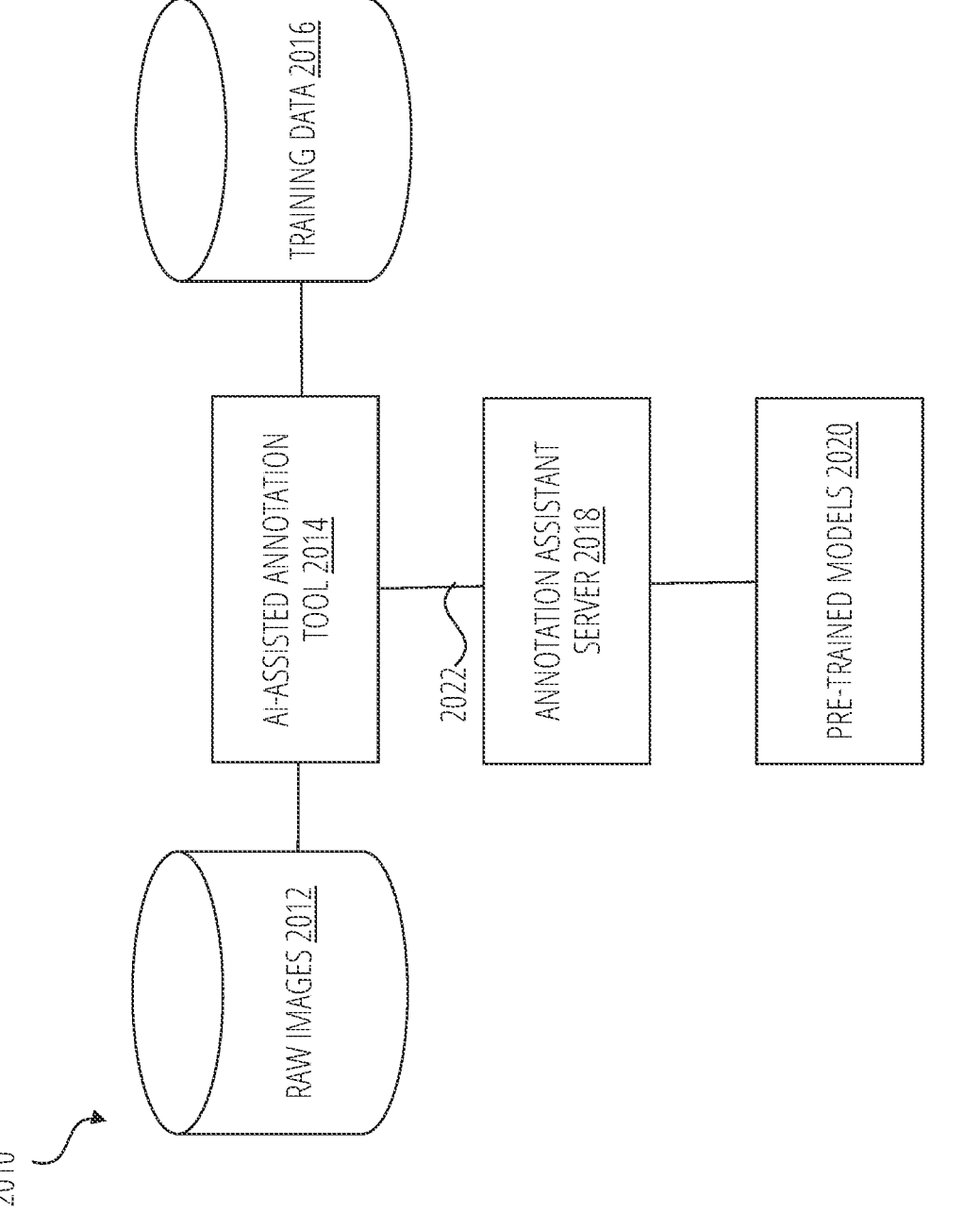

FIG. 20B is an example illustration of a client-server architecture 2010 to enhance annotation tools with pre-trained annotation models, in accordance with at least one embodiment. In at least one embodiment, AI-assisted annotation tools 2014 may be instantiated based on a client-server architecture 2010. In at least one embodiment, annotation tools 2014 in imaging applications may aid radiologists, for example, in identifying organs and abnormalities. In at least one embodiment, imaging applications may include software tools that help a user 2006 to identify, as a non-limiting example, a few extreme points on a particular organ of interest in raw images 2012 (e.g., in a 3D MRI or CT scan) and receive auto-annotated results for all 2D slices of a particular organ. In at least one embodiment, results may be stored in a data store as training data 2016 and used as (for example and without limitation) ground truth data for training. In at least one embodiment, when the computing device sends extreme points for AI-assisted annotation 1810, a deep learning model, for example, may receive this data as input and return inference results of a segmented organ or abnormality. In at least one embodiment, pre-instantiated annotation tools, such as AI-Assisted Annotation Tool 2014 in FIG. 20B may be enhanced by making API calls to a server, such as an Annotation Assistant Server 2018 that may include a set of pre-trained models 2020 stored in an annotation model registry, for example. In at least one embodiment, an annotation model registry may store pre-trained models 2020 (e.g., machine learning models, such as deep learning models) that are pre-trained to perform AI-assisted annotation on a particular organ or abnormality. These models may be further updated by using training pipelines 1904. In at least one embodiment, pre-installed annotation tools may be improved over time as new feedback data is added.

Such components can be used to generate synthetic data imitating failure cases in a network training process, which can help to improve the performance of the network while limiting the amount of synthetic data to avoid overfitting.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof)

is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions, and a main central processing unit ("CPU") executes some of the instructions while a graphics processing unit ("GPU") executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or in parallel, continuously or intermittently. The terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures may be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

determining, using a computing device comprising a plurality of cores, a set of processes executed by the computing device;

predicting, using a machine learning (ML) model, a first number of cores to be utilized by a first process of the set of processes and a second number of cores to be utilized by a second process of the set of processes;

determining a number of cores of the plurality of cores to be placed in a lower power state based at least on subtracting the first number and the second number from a total number of available cores; and updating a first mode of the number of cores to a second mode in which the number of cores consumes less power than in the first mode.

2. The method of claim 1, wherein the ML model is trained using at least historical core utilization data for at least one process of the set of processes, and wherein the ML model is deployed to a second computing device operatively coupled to the computing device.

3. The method of claim 1, wherein the ML model is trained using at least historical core utilization data for at least one process of the set of processes during a first amount of time, and wherein the number of cores is updated to the second mode for a second amount of time, wherein the first amount of time and the second amount of time comprise the same duration of time.

4. The method of claim 1, wherein the total number of available cores is less than a total number of the plurality of cores.

5. The method of claim 1, wherein:

the predicting the first number of cores comprises predicting the first number of cores to be utilized by the first process for a next time period;

the predicting the second number of cores comprises predicting the second number of cores to be utilized by the second process for the next time period;

the number of cores is updated to the second mode for the next time period; and the ML model is trained using historical core utilization data for the first process and the second process during one or more previous time periods.

6. The method of claim 1, further comprising:

determining, using the computing device, a second set of processes executed by the computing device at a second time subsequent to the updating the number of cores to the second mode;

determining, using the ML model, a second number of cores of the plurality of cores to be placed in a lower power state based on the second set of processes; and updating the first mode of the second number of cores to the second mode.

7. The method of claim 1, further comprising:

collecting, using the computing device, core utilization data for each process executed by the computing device during a first time period, the core utilization data comprising, for each process, a process identifier, a count of utilized cores, and a timestamp; and storing the core utilization data for each process as historical core utilization data in a database operatively coupled to the computing device, wherein the ML model is trained using the historical core utilization data for each process of the set of processes.

8. The method of claim 1, wherein the ML model is at least one of a random forest regression model or a support vector machine (SVM) model.

9. The method of claim 1, wherein the set of processes comprises at least one of an application, a job, a task, or a routine executed by the plurality of cores.

10. A computing device comprising:

a plurality of processing units to:

determine a set of processes executed by the computing device;

predict, using a machine learning (ML) model, a first number of cores to be utilized by a first process of the set of processes and a second number of cores to be utilized by a second process of the set of processes;

determine a number of processing units of the plurality of processing units to be placed in a lower power state based at least on subtracting the first number and the second number from a total number of available cores; and update a first mode of the number of processing units to a second mode in which the number of processing units consumes less power than in the first mode.

11. The computing device of claim 10, wherein the plurality of processing units is to:

collect utilization data for each process executed by the computing device during a first time period, the utilization data comprising, for each process, a process identifier, a count of utilized processing units, and a timestamp; and store the utilization data for each process as historical utilization data in a database operatively coupled to the computing device, wherein the ML model is trained using the historical utilization data for each process of the set of processes, and wherein the ML model is deployed to a second computing device operatively coupled to the computing device.

12. The computing device of claim 10, wherein the ML model is trained using at least historical utilization data for at least one process of the set of processes during a first amount of time, and wherein the number of processing units is updated to the second mode for a second amount of time, wherein the first amount of time and the second amount of time comprise the same duration of time.

13. The computing device of claim 10, wherein the total number of available processing units is less than a total number of the plurality of processing units.

14. The computing device of claim 10, wherein the plurality of processing units is further to:

determine a second set of processes executed by the computing device at a second time subsequent to updating the number of processing units to the second mode;

determine, using the ML model, a second number of processing units of the plurality of processing units to be placed in a lower power state based on the second set of processes; and update the first mode of the second number of processing units to the second mode.

15. A system comprising:

a first device comprising a plurality of cores;

a second device hosting a machine learning (ML) model trained to predict a number of cores of the plurality of cores to be placed in a lower power state based at least on a given set of processes executed by the first device; and a database to store historical core utilization data for at least one process of the set of processes executed by the first device, wherein the first device is to:

determine a first set of processes executed by the first device;

predict, using the ML model, a first number of cores to be utilized by a first process of the first set of processes and a second number of cores to be utilized by a second process of the first set of processes;

determine a first subset of cores of the plurality of cores to be powered down based at least on subtracting the first number and the second number from a total number of available cores; and update a first mode of the first subset of cores to a second mode in which the first subset of cores consumes less power than in the first mode.

16. The system of claim 15, wherein the first device is further to:

determine a second set of processes executed by the first device at a subsequent time to the first set of processes;

determine, using the ML model, a second subset of cores of the plurality of cores to be placed in a lower power state based at least on the second set of processes; and update a first mode of the second subset of cores to a second mode of the second subset of cores in which the second subset of cores consumes less power than in the first mode.

17. The system of claim 15, wherein the ML model is at least one of a random forest regression model or a support vector machine (SVM) model, and wherein the first set of processes comprises at least one of an application, a job, a task, or a routine executed by the plurality of cores.

18. The system of claim 15, wherein the system comprises one or more of:

a control system for an autonomous or semi-autonomous machine;

a perception system for an autonomous or semi-autonomous machine;

a system for performing simulation operations;

a system for performing deep learning operations;

a system for generating synthetic data;

a system for generating multi-dimensional assets using a collaborative content platform;

a system implemented using an edge device;

a system implemented using a robot;

a system incorporating one or more virtual machines (VMs);

a system implemented at least partially in a data center; or a system implemented at least partially using cloud computing resources.

* * * * *